US012669444B2

(12) United States Patent
Stryzheus et al.

(10) Patent No.: US 12,669,444 B2
(45) Date of Patent: Jun. 30, 2026

(54) SYSTEM AND METHOD OF INSPECTING A SURFACE

(71) Applicant: The Boeing Company, Arlington, VA (US)

(72) Inventors: Veniamin Stryzheus, Kent, WA (US); Shereef Shehab, Seattle, WA (US); Naman Shah, Seattle, WA (US); William Talion Edwards, Wentzville, MO (US)

(73) Assignee: The Boeing Company, Arlington, VA (US)

( * ) Notice: Subject to any disclaimer, the term of this patent is extended or adjusted under 35 U.S.C. 154(b) by 129 days.

(21) Appl. No.: 18/818,510

(22) Filed: Aug. 28, 2024

(65) Prior Publication Data

US 2026/0063562 A1     Mar. 5, 2026

(51) Int. Cl.
*G01N 21/88*          (2006.01)

(52) U.S. Cl.
CPC . *G01N 21/8851* (2013.01); *G01N 2021/8864* (2013.01); *G01N 2021/8887* (2013.01)

(58) Field of Classification Search
CPC ....... G01N 21/8851; G01N 2021/8864; G01N 2021/8887
See application file for complete search history.

(56) References Cited

U.S. PATENT DOCUMENTS

2017/0146462 A1     5/2017   Baker
2021/0327134 A1*  10/2021   Pochiraju ............... G06T 7/001

FOREIGN PATENT DOCUMENTS

EP             3428571        1/2019

OTHER PUBLICATIONS

Zeiss, "T-Hawk-2 Scanner datasheet," retrieved on Aug. 28, 2024.
Zeiss, "ATOS Scanner datasheet," retrieved on Aug. 28, 2024.
EPO, Extended European Search Report, appl. No. 25190585.7, issued on Jan. 7, 2026.
Yang, et al.: "3D surface defect analysis and evaluation", Proceedings volume—Two- and Three-Dimensional Methods for Inspection and Metrology VI, 706601, Aug. 29, 2008 (Aug. 29, 2008), p. 706608, XP040442096, G01B, DOI: availaable at <https://doi.org/10.1117/12.799883>.

* cited by examiner

*Primary Examiner* — Jamil Ahmed

(57) ABSTRACT

A surface inspection system for inspecting an inspection surface includes a three-dimensional (3D) scanner configured to scan the inspection surface and acquire a point cloud of points representing at least the localized portion. The localized portion includes a non-defective region and a suspect region at least partially surrounded by the non-defective region and potentially containing one or more defects. The surface inspection system includes a processor establishes a reference surface based on the points in the non-defective region and exclusive of the points in the suspect region, and the reference surface extends across the suspect region. The processor determine one or more characteristics of a shape of the point cloud relative to the reference surface within the suspect region.

20 Claims, 30 Drawing Sheets

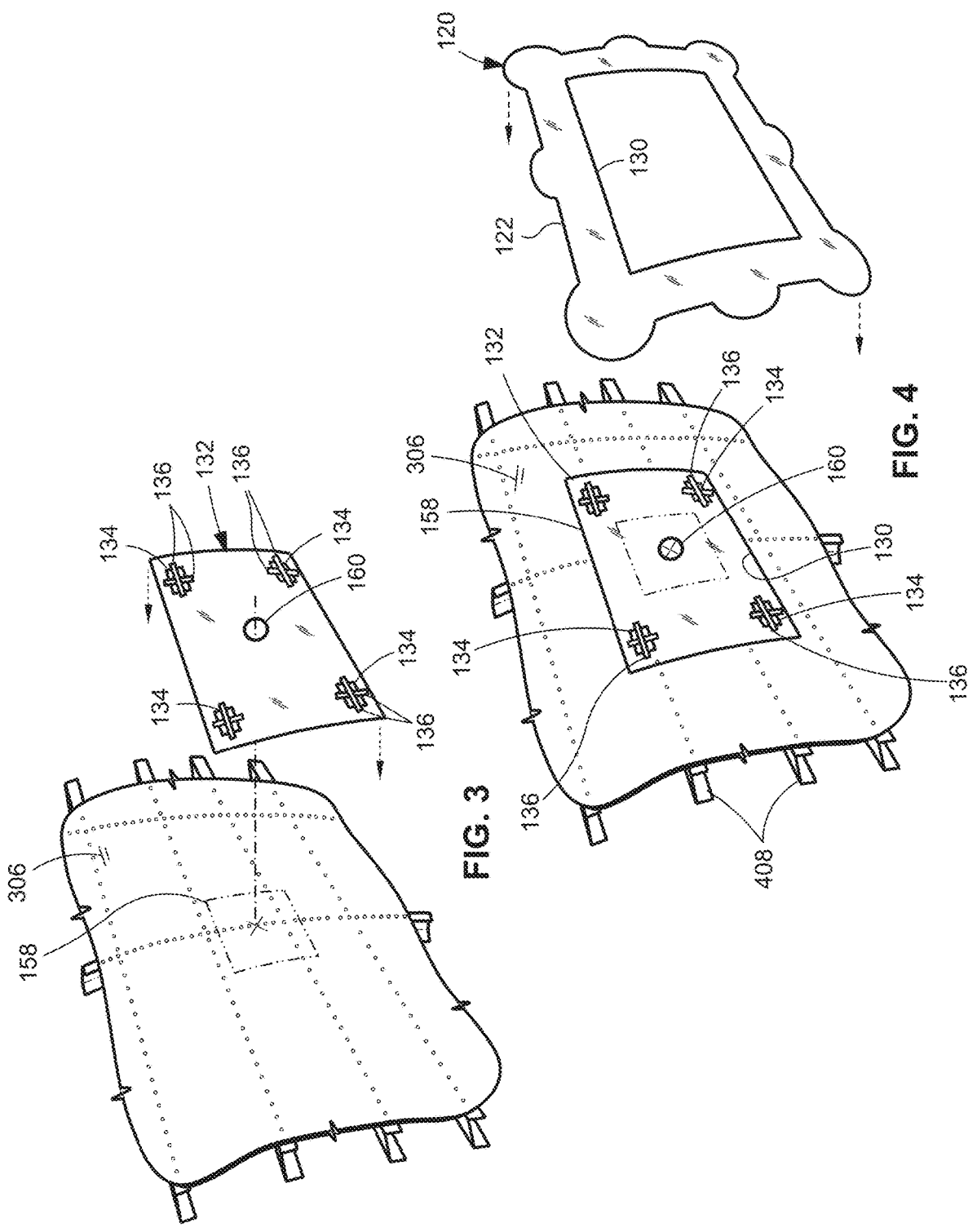

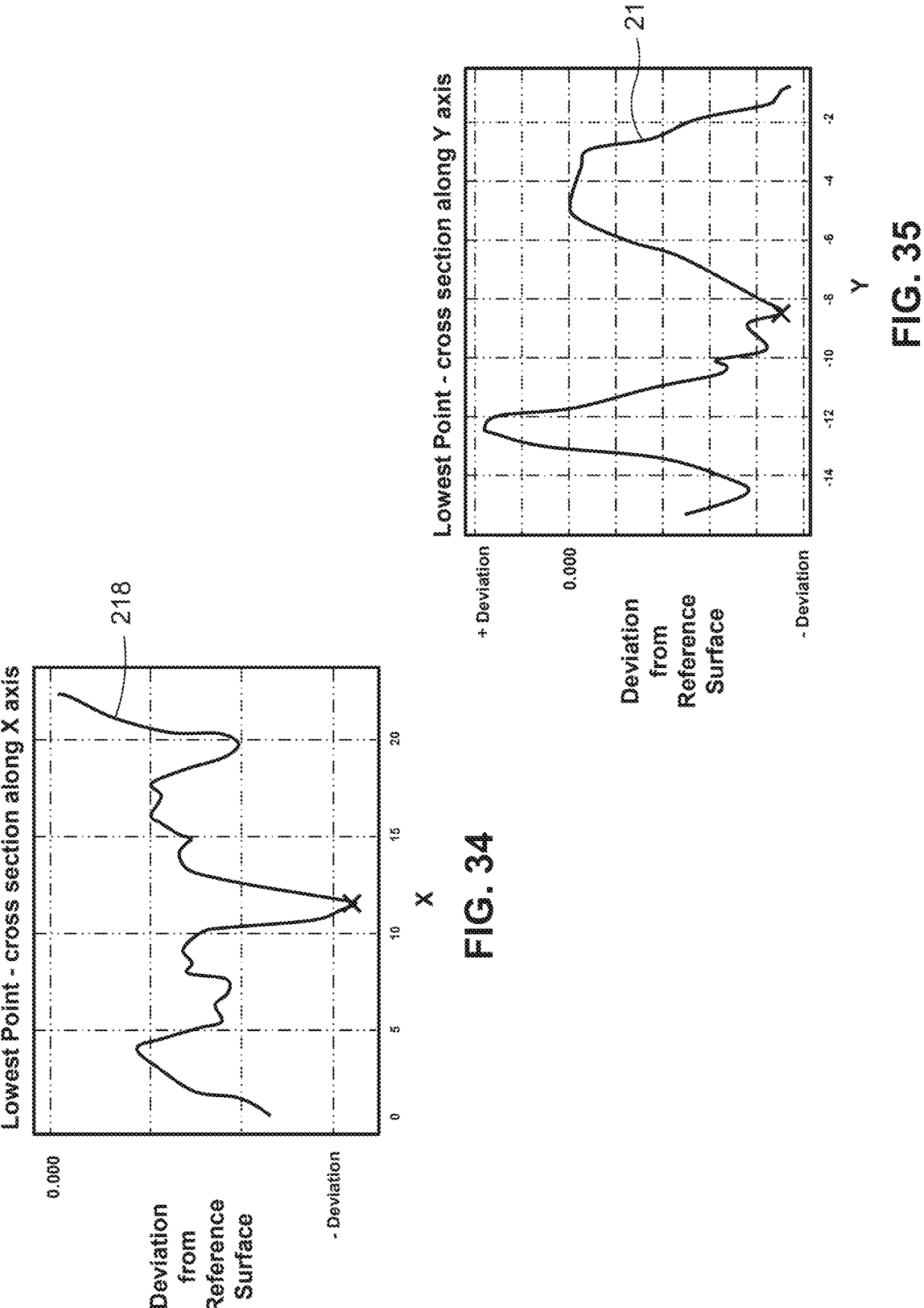

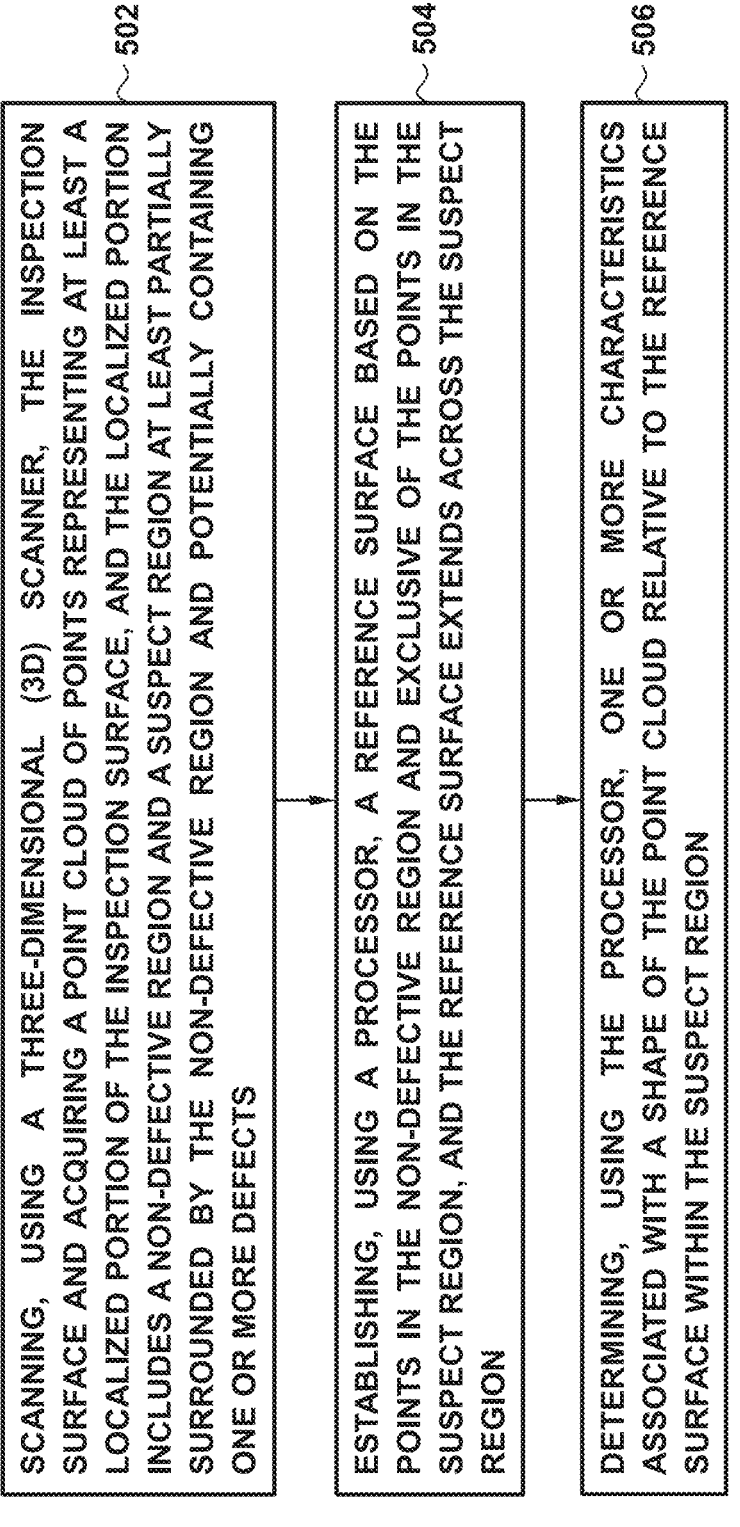

500

502

SCANNING, USING A THREE-DIMENSIONAL (3D) SCANNER, THE INSPECTION SURFACE AND ACQUIRING A POINT CLOUD OF POINTS REPRESENTING AT LEAST A LOCALIZED PORTION OF THE INSPECTION SURFACE, AND THE LOCALIZED PORTION INCLUDES A NON-DEFECTIVE REGION AND A SUSPECT REGION AT LEAST PARTIALLY SURROUNDED BY THE NON-DEFECTIVE REGION AND POTENTIALLY CONTAINING ONE OR MORE DEFECTS

504

ESTABLISHING, USING A PROCESSOR, A REFERENCE SURFACE BASED ON THE POINTS IN THE NON-DEFECTIVE REGION AND EXCLUSIVE OF THE POINTS IN THE SUSPECT REGION, AND THE REFERENCE SURFACE EXTENDS ACROSS THE SUSPECT REGION

506

DETERMINING, USING THE PROCESSOR, ONE OR MORE CHARACTERISTICS ASSOCIATED WITH A SHAPE OF THE POINT CLOUD RELATIVE TO THE REFERENCE SURFACE WITHIN THE SUSPECT REGION

FIG. 37

SYSTEM AND METHOD OF INSPECTING A SURFACE

FIELD

The present disclosure relates generally to inspection systems and, more particularly, to a system and method for inspecting a surface.

BACKGROUND

Within the commercial aircraft industry, inspections are an essential part of the production process for ensuring the quality and safety of the aircraft. For example, during various stages of the production of a fuselage, exterior skins are inspected for conformance with surface contour requirements. One inspection method involves the use of a straight edge and feeler gauges for measuring bulges and depressions in the skins, which can affect the aesthetics, aerodynamics, and/or structural integrity of the fuselage. Although generally effective, the straight-edge method is a time-consuming process and has poor repeatability.

Other inspection methods use scanners and analysis packages to measure and analyze three-dimensional surface data. However, such methods can produce biased measurements and/or improperly interpret the inspection data in accordance with surface contour requirements. In addition, existing surface inspection methods can delay the detection of surface non-conformances until late in the production cycle after the fuselage has been coated with gloss paint, which enhances visual detection. Unfortunately, detecting non-conformances late in the production cycle increases the cost and time required for rework, and results in delays in delivering the product to the customer.

As can be seen, there exists a need in the art for a system and method for inspecting surface contours in a timely manner and with a high degree of repeatability and accuracy and which properly interprets the inspection data in accordance with surface contour requirements.

SUMMARY

The above-noted needs associated with surface inspections are addressed by the present disclosure, which provides a surface inspection system for inspecting a localized portion of an inspection surface of a structure. The surface inspection system includes a three-dimensional (3D) scanner configured to scan the inspection surface and acquire a point cloud of points representing at least the localized portion. The localized portion includes a non-defective region and a suspect region at least partially surrounded by the non-defective region and potentially containing one or more defects. The surface inspection system further includes a processor configured to establish a reference surface based on the points in the non-defective region and exclusive of the points in the suspect region. The reference surface extends across the suspect region. The processor is also configured to determine one or more characteristics of a shape of the point cloud relative to the reference surface within the suspect region.

Also disclosed is a surface inspection system having a scan template, a 3D scanner, and a processor. The scan template is positionable in relation to the inspection surface and defines a size and a shape of the localized portion of the inspection surface. The localized portion contains a non-defective region and a suspect region at least partially surrounded by the non-defective region and potentially having one or more defects. The 3D scanner is configured to scan the localized portion and acquire a point cloud of points. The processor configured to establish a reference surface based on the points in the non-defective region and exclusive of the points in the suspect region. The processor is also configured to determine one or more characteristics associated with a shape of the point cloud relative to the reference surface within the suspect region. The characteristics include a location and a height of a highest point, a location and a depth of a lowest point, and a location and an orientation of a slope gradient of a contour cross section that passes through at least one of the highest point and the lowest point, and is oriented parallel to a principal direction of surface contour requirements of the localized portion.

In addition, disclosed is a method of inspecting an inspection surface of a structure. The method includes scanning, using a 3D scanner, the inspection surface and acquiring a point cloud of points representing at least a localized portion of the inspection surface. The localized portion includes a non-defective region and a suspect region at least partially surrounded by the non-defective region and potentially containing one or more defects. The method also includes establishing, using a processor, a reference surface based on the points in the non-defective region and exclusive of the points in the suspect region. The reference surface extends across the suspect region. In addition, the method includes determining, using the processor, one or more characteristics associated with a shape of the point cloud relative to the reference surface within the suspect region.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 3 is magnified view of a portion of the fuselage of FIG. 2 and showing an example of a template positioning aide having an approximate center for centering a scan template on a suspect region of the inspection surface and which potentially contains one or more defects;

FIG. 4 shows the template positioning aide installed on the inspection surface;

FIG. 34 is a plot of the cross-sectional profile of the suspect region passing through the lowest point and aligned with the longitudinal direction (e.g., x-axis) of the fuselage;

FIG. 35 is a plot of the cross-sectional profile of the suspect region passing through the lowest point and aligned with the circumferential direction (y-axis) of the fuselage;

FIG. 37 is a flowchart of operations included in a method of inspecting a surface of a structure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one example," "an example," and "some examples." Instances of the phrases "one example," "an example," or "some examples" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
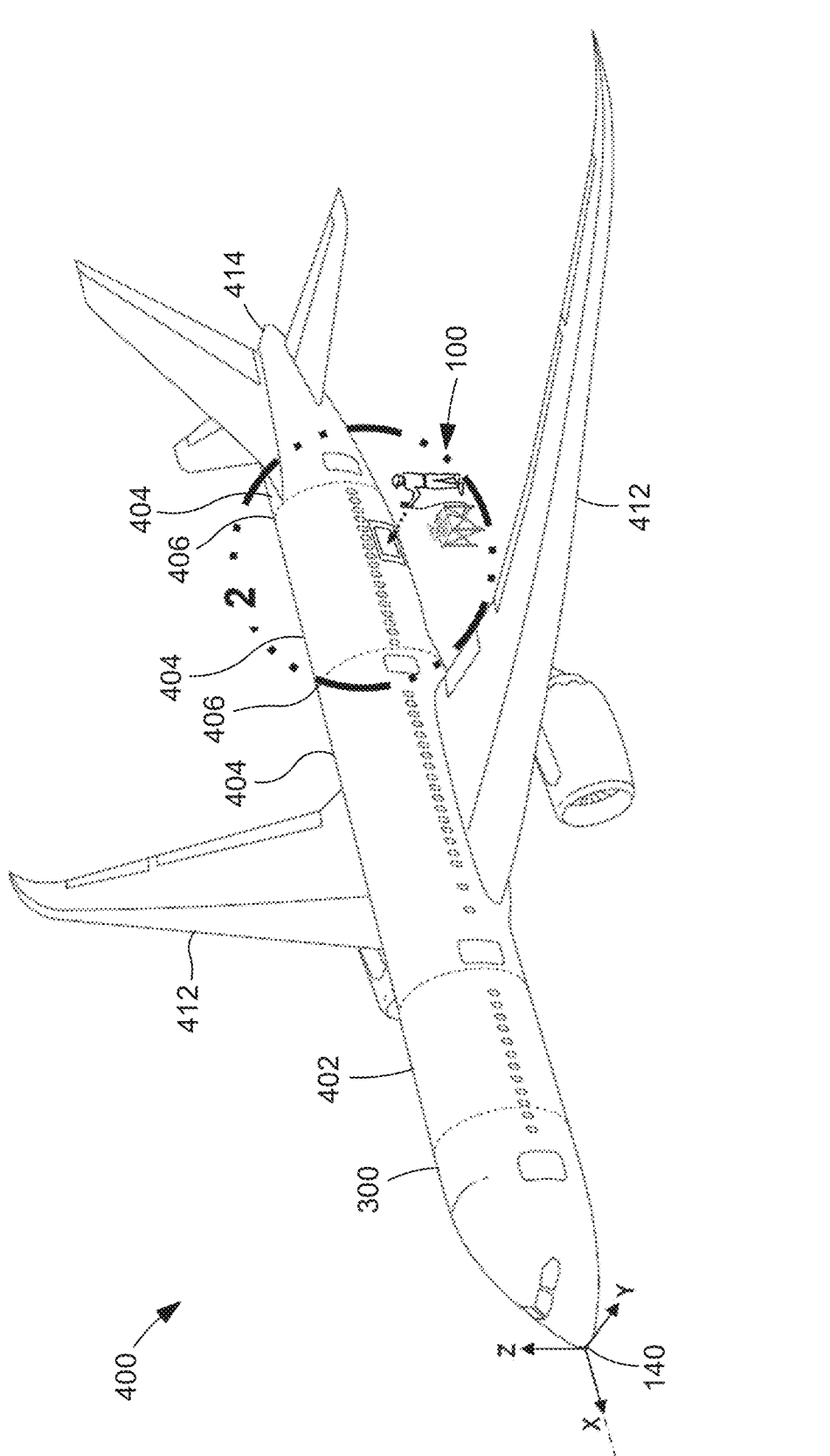
FIG. 1 shows an example of an aircraft having a fuselage comprised of end-to-end barrel sections.

Referring now to the drawings which illustrate various examples of the disclosure, shown in FIG. 1 is an aircraft 400, which serves as an example of a structure 300 for which the presently disclosed surface inspection system 100 and method (FIG. 37) are used for inspecting the aircraft 400 surfaces. The aircraft 400 includes a fuselage 402, a pair of wings 412, and an empennage 414 containing tail surfaces such as horizontal elevator and a vertical fin. In the example shown, the fuselage 402 is comprised of separately manufactured barrel sections 404 which are subsequently joined end-to-end at a plurality of section joins 406, as illustrated in FIGS. 1-2.

Figure 2:
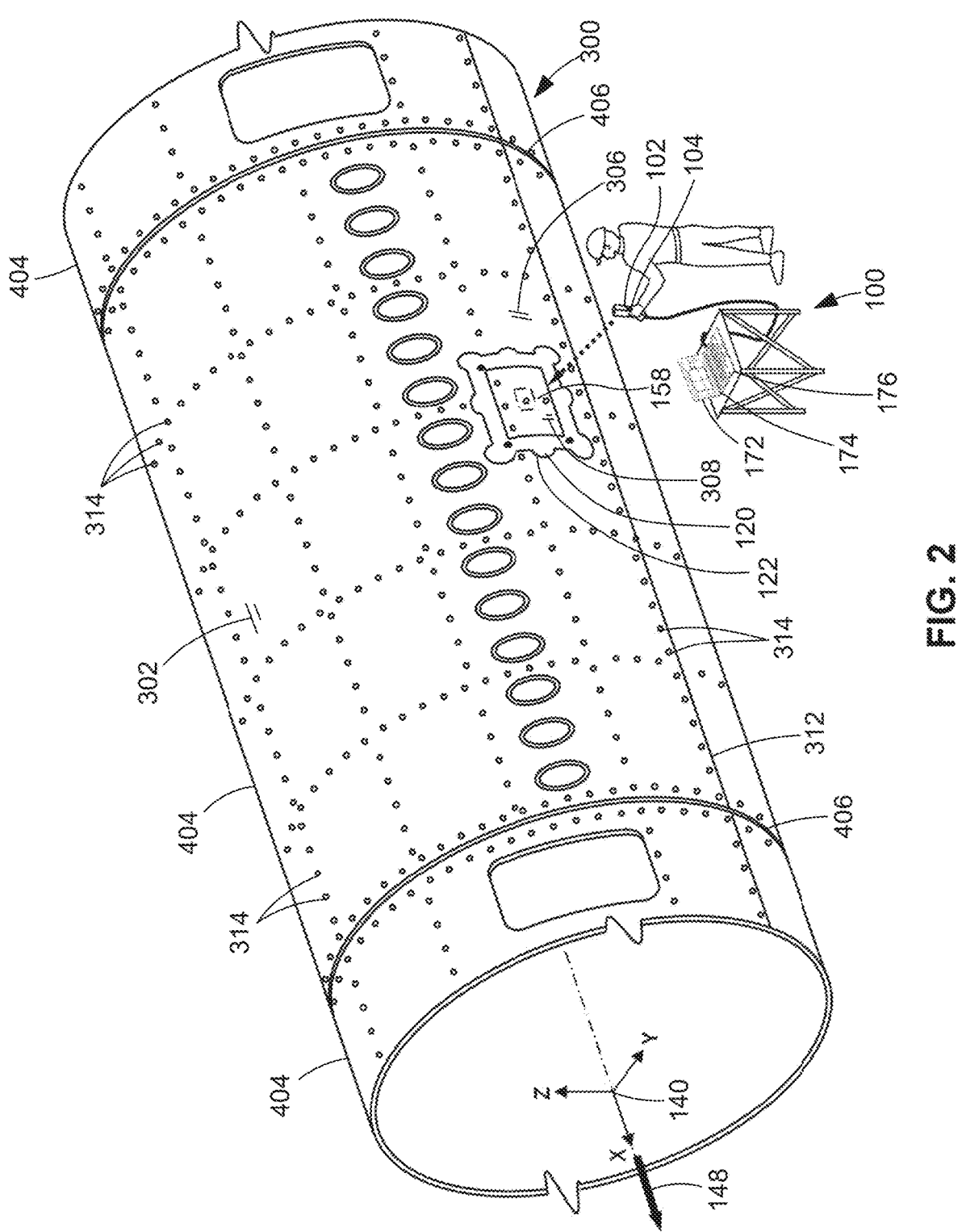
FIG. 2 shows one of the barrel sections of FIG. 1, and illustrating an example of the presently disclosed surface inspection system having a three-dimensional (3D) scanner configured to scan an inspection surface of the fuselage and acquire a point cloud of points representing at least a localized portion of the inspection surface, and further illustrating a computing device having a processor for processing the point cloud in manner establishing a reference surface, and determining one or more characteristics regarding the shape of the point cloud relative to the reference surface.
Figure 7:
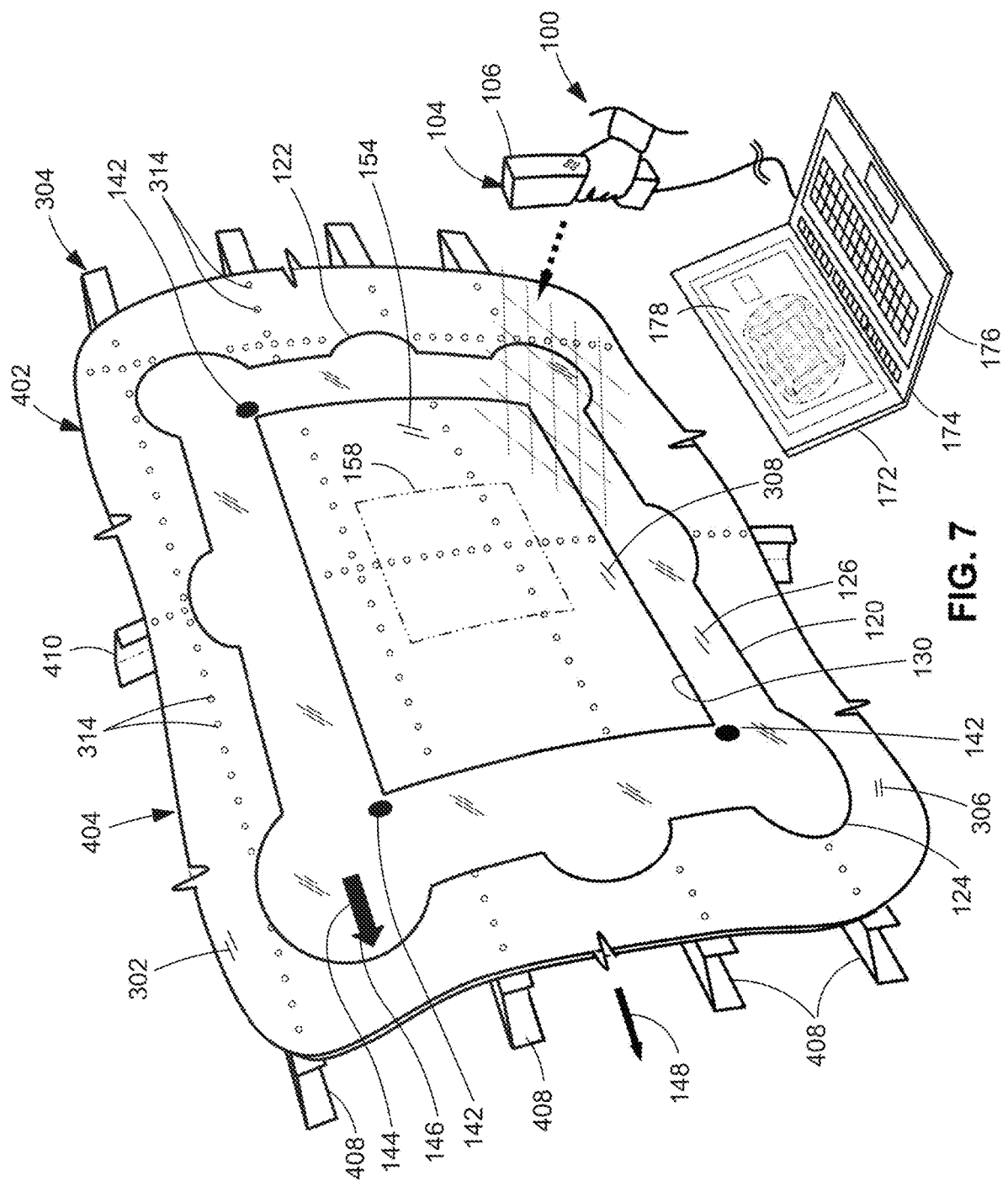
FIG. 7 shows an example of a 3D scanner configured as a crossed-laser-line scanner, which is held by an operator for scanning the scan template and the portion of the fuselage surrounded by the scan template.

In FIG. 2, shown is one of the barrel sections 404 during an inspection of the exterior surfaces using the presently disclosed surface inspection system 100. In the example shown, the barrel section 404 is of metallic construction and the exterior surface is defined by a metallic skin 302 that is coupled via fasteners 314 to underlying structural members 304 such as longerons 408 (FIG. 7) and circumferential frames 410 (FIG. 7). Although described in the context of a skin 302 of a fuselage 402, the surface inspection system 100 and method 500 can be implemented for inspecting the surfaces of any one of a variety of different types of structures, and is not limited to aircraft 400. For example, the surface inspection system 100 and method 500 can be implemented for inspecting the any large, contoured surface such as that of a ship hull, a windmill air foil, a power generating turbine blade, a large-area antenna, a sheet metal clad building or roof (e.g., inspect for hail damage), and any one of a variety of different types of surfaces. In addition, the surface inspection system 100 can be implemented for inspecting the surfaces of structures formed of any type of material including metallic material (e.g., aluminum, etc.) and/or non-metallic material (e.g., carbon-fiber composite material).

The surface inspection system 100 is configured to perform a deviation analysis by measuring and characterizing a localized portion 308 of an inspection surface 306 (i.e., a surface under inspection) of a structure 300 for determining if a suspect region 158 of the localized portion 308 meets surface contour requirements (e.g., aerodynamic requirements) specified for the inspection surface 306. The surface inspection system 100 is configured to inspect the inspection surface 306 for depressions 210 (FIG. 26), bulges 206 (FIG. 26), ridges, ripples, and other surface characteristics that potentially violate the surface contour requirements. The surface inspection system 100 is capable of measuring and characterizing inspection surfaces 306 of any shape and size, regardless of whether the inspection surface 306 is planar, simply curved, or complexly curved. Advantageously, the surface inspection system 100 collects a sufficient amount of data to allow for accurate assessment of an inspection surface 306, in addition to providing context for root cause analysis of potential defects.

As shown in FIG. 2, the inspection system includes a data acquisition system 102 and a data analysis system 170. The data acquisition system 102 includes a three-dimensional (3D) scanner 104 configured to scan an inspection surface 306 and generate 3D data for surface reconstruction. In this regard, the 3D scanner 104 acquires a point cloud 150 (FIG. 10) of points 152 (FIG. 10) representing at least a localized portion 308 (FIG. 7) of the inspection surface 306 (FIG. 7). In addition to the 3D scanner 104, the data acquisition system 102 includes a scan template 120 (i.e., a field-of-view template) which is positionable relative to the inspection surface 306. The scan template 120 has a frame-like template body 126 (FIG. 7) having a template opening 130 (FIG. 7) that defines the size and shape of a localized portion 308 of the inspection surface 306. The localized portion 308 preferably surrounds the suspect region 158 potentially containing one or more defects. As described below, the scan template 120 serves to crop the area of the point cloud 150 surrounding the localized portion 308. In addition, the scan template 120 allows the 3D scanner 120 to localize itself (i.e., data localization) to the structure 300 (e.g., aircraft 400).

The data analysis system 170 includes a processor 172 print FIG. 2) communicatively coupled to the 3D scanner 104. In example of FIGS. 1-2, the processor 172 is included in a computing device 174 such as a laptop computer 176, which may be located near the 3D scanner 104. The processor 172 processes the 3D data in a manner allowing proper interpretation of surface characteristics of the inspection surface 306, including identifying any surface defects in the suspect region 158. In the present disclosure, surface defects are interchangeably referred to as defects, non-conformances, anomalies, irregularities, and out-of-tolerance conditions. The processor 172 is configured to establish a reference surface 164 (FIGS. 22-23) based on the point cloud 150, and determine one or more characteristics (e.g., surface defects) of the shape of the point cloud 150 relative to the reference surface 164, as described in greater detail below.

In the presently disclosed surface inspection system 100, the data acquisition system 102 (FIG. 2) is directly linked to the data analysis system 170 (FIG. 2) such that once the 3D scanner 104 acquires a point cloud 150 (FIG. 10) of an inspection surface 306 of a structure 300, the processor 172 autonomously processes the point cloud 150 data via a framework that allows for proper interpretation in view of surface contour requirements specified for the inspection surface 306, as described below. The surface inspection system 100 also includes a data reporting system in which the processor 172 autonomously generates a report 200 (FIGS. 26-36) containing inspection results including location data of the inspection surface 306. The inspection results are autonomously stored in a data library (not shown) and continuously incorporated into a digital thread (e.g., a digital twin of the structure-not shown) for monitoring the location of defects (e.g., depressions 210 and bulges 206) identified using the surface inspection system 100. Advantageously, the digital thread can be reviewed throughout the product lifecycle. Root cause analysis and disposition and repair actions can also be stored in the digital thread for quick access and to facilitate automated root cause determination (e.g., via machine learning) of defects in future versions of the structure 300.

In FIG. 2, the 3D scanner 104 is a handheld scanner that is manipulated by a human (i.e., an operator), and the scan template 120 is a physical template 122 mounted on the inspection surface 306 (e.g., the barrel section 404). To initiate the process of inspecting the inspection surface 306, the operator visually identifies a suspect region 158 of a localized area of the inspection surface 306 and which potentially contains one or more defects. For example, the operator may visually observe depressions 210 and/or bulges 206 in the inspection surface 306 that potentially violate surface contour requirements specified for the inspection surface 306. In the example shown, the suspect region 158 has a square shape of approximately 8 by 8 inches. However, the suspect region 158 may have any one of a variety of other shapes and sizes and is not limited to an orthogonal shape. As an alternative to visually identifying a suspect region 158, a 3D scanner 104 may be used to identify a suspect region 158 of an inspection surface 306 using stochastic thresholds or surface rate-of-change thresholds. The identification of a suspect region 158 using thresholds typically results in an irregularly shaped contour (not shown) which defines the boundary of the suspect region 158.

In the example of FIG. 2, after identifying the suspect region 158, the scan template 120 is mounted on the inspection surface 306 to start the process of assessing the surface characteristics of the suspect region 158 to determine whether the depressions 210 and/or bulges 206 initially observed actually violate the surface contour requirements. The scan template 120 is mounted to the inspection surface 306 in a manner such that the template opening 130 surrounds the suspect region 158. In this regard, the template opening 130 of the scan template 120 is larger than the suspect region 158 to provide context for measuring the surface characteristics within the suspect region 158 and allowing for proper interpretation of the surface characteristics and allowing inspection buy-off to occur.

Figures 5, 6:
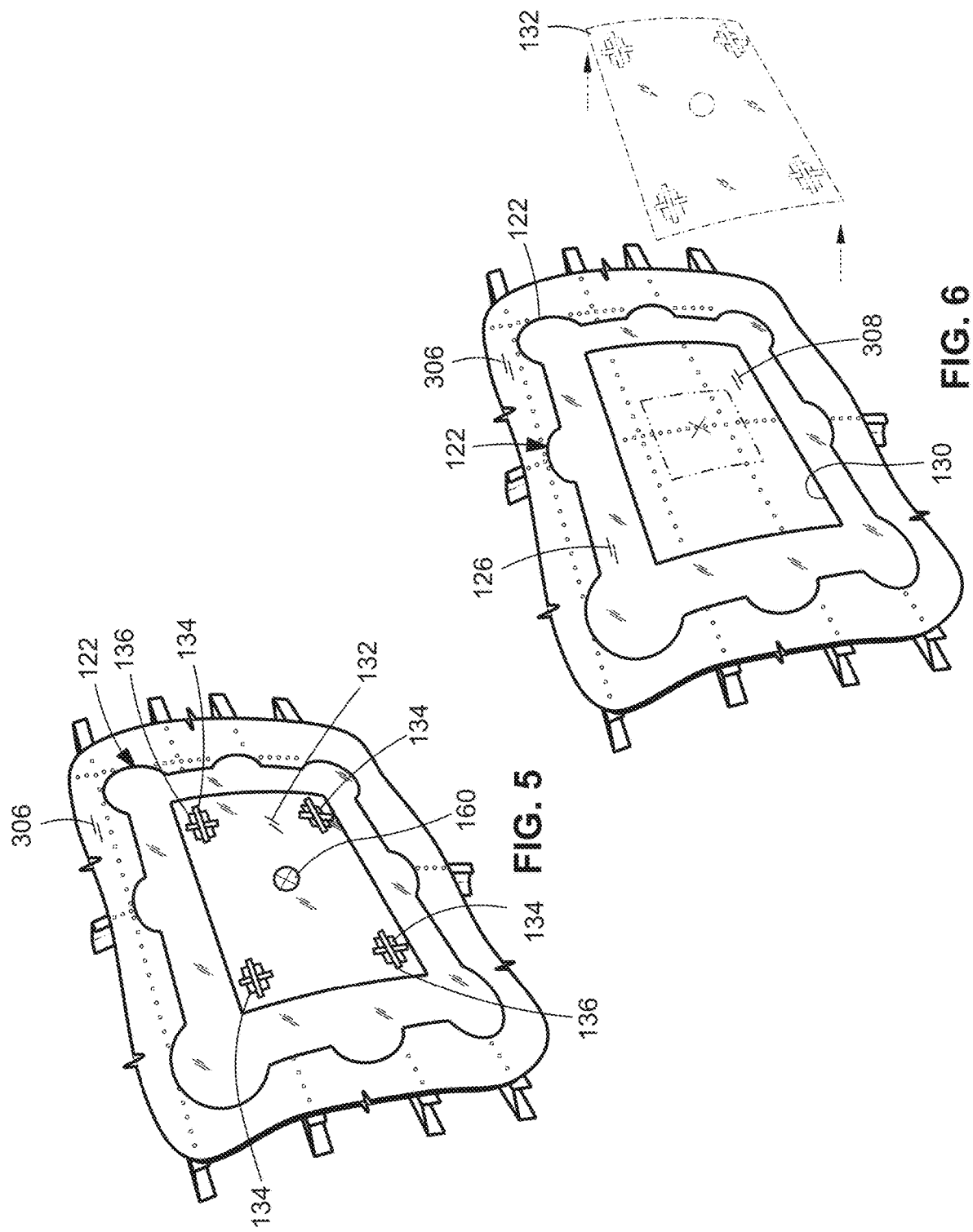
FIG. 5 shows an example of a scan template positioned on the inspection surface via the template positioning aide.
FIG. 6 shows the template positioning aide removed from the inspection surface, leaving the scan template.

Referring to FIGS. 3-6, shown is an example of a template positioning aide 132 for positioning a physical template 122 (i.e., scan template 120) on the inspection surface 306 at the location of the suspect region 158. In the example shown, the template positioning aide 132 has an orthogonal shape that is complementary to the orthogonal shape of the template opening 130 in the physical template 122. The template positioning aide 132 includes a hole at its approximate center 160 for centering the template positioning aide 132 on the suspect region 158, which is identified by an X. In the example shown, the corners of the template positioning aide 132 include openings 134 for attaching the template positioning aide 132 to the inspection surface 306 via adhesive tape 136, as shown in FIGS. 4-5. However any one of a variety of other mechanisms may be implemented for removably attaching the template positioning aide 132 to the inspection surface 306.

FIGS. 5-6 show the physical template 122 mounted on the inspection surface 306 via the template positioning aide 132. The physical template 122 can be removably held in place via adhesive tape (not shown) on the edges of the physical template 122 or via other means such as double-sided tape. Once the physical template 122 is positioned in alignment with the template positioning aide 132 and secured to the inspection surface 306, the template positioning aide 132 can be removed as shown in FIG. 6, exposing the localized portion 308 of the inspection surface 306 surrounded by the template body 126.

Referring to FIG. 7, shown is an example of a physical template 122 secured to the inspection surface 306 and defining the localized portion 308, which is surrounded by the template body 126. As mentioned above, the physical template 122 is configured to be removably attached to the inspection surface 306 prior to scanning via the 3D scanner 104. The physical template 122 can be formed of flexible material that is conformable to the shape of the inspection surface 306. For example, the physical template 122 can be a sheet of non-metallic material (e.g., cardboard, plastic, paper, etc.) or a sheet of metallic material (e.g., aluminum, etc.).

In the example shown, the template opening 130 is orthogonally shaped (e.g., rectangular, square) but may be provided in alternative shapes such as a round shape (circular, oval, etc.). The template opening 130 defines the shape and size of the localized portion 308. The localized portion 308 is comprised of two regions, including the suspect region 158 and a non-defective region 154 which surrounds the suspect region 158. The non-defective region 154 is larger than the suspect region 158 to allow for proper assessment of an inspection surface 306. In one example, the area of the non-defective region 154 is 1.5 to 20 times larger than the area of the suspect region 158. However, in other examples, the non-defective region 154 can be more than 20 times larger than suspect region 158.

As mentioned above, the non-defective region 154 is used to give context to the suspect region 158. In this regard, the non-defective region 154 is not necessarily nominal, in that the non-defective region 154 of an as-built structure 300 may not exactly correspond to the as-designed configuration of the structure 300 for various reasons. For example, the effects of gravity or temperature change on an as-built structure 300 are typically not represented in a digital version (e.g., CAD model) of the structure 300. However, in the present disclosure, the non-defective region 154 of the as-built structure 300 is presumed to be generally devoid of significant surface defects, and is therefore used to generate a reference surface 164 (FIGS. 22-23) to which the points 152 in the suspect region 158 (FIGS. 24-25) are compared.

In some examples, the surface inspection system 100 can be used for defining the suspect region 158 as an alternative for visually identifying the suspect region 158. For example, when the scan template 120 is mounted on the inspection surface 306, a 3D scanner 104 can scan the inspection surface 306 and generate a point cloud 150. The processor 172 receives the point cloud 150 data from the 3D scanner 104, and designates a center portion 156 of the point cloud 150 as the suspect region 158. For example, the processor 172 can designate a smaller region of the point cloud 150 as the suspect region 158, and which is presumed to contain points 152 that represent potential defects. The presumption that the center portion 156 of the point cloud 150 contains potential defects may be based on historical data such as inspection reports from previously manufactured versions of the same structure 300. Alternatively or additionally, the method of designating the center portion 156 of the point cloud 150 as the suspect region 158 can be used when defects are difficult to visually detect, such as when the inspection surface 306 has low reflectance or is covered with a low-reflectance coating such as primer or an anti-corrosion coating.

In still other examples, the processor 172 can designate as the suspect region 158 an area of the point cloud 150 that contains points 152 that deviate from a deviation threshold (not shown) relative to the remaining points 152 in the point cloud 150. For example, as mentioned above, the processor 172 can perform computations on the point cloud 150 based on a stochastic threshold or based on a surface-rate-of-change threshold, and designate as the suspect region 158 the portion of the point cloud 150 containing points 152 that deviate from the stochastic threshold or surface-rate-of-change threshold. In such examples, the shape of the point cloud 150 is typically defined by a contour (not shown) of the inspection surface 306.

In addition to defining the size of the non-defective region 154 based on the size of the suspect region 158, the non-defective region 154 can also be sized and/or shaped to encompasses an area of the structure 300 containing at least one underlying structural member 304 (FIG. 7). Sizing the non-defect region in this manner may provide insights into whether such underlying structural members 304 are contributing to the existence or formation of surface defects potentially contained in the suspect region 158. In some examples, the underlying structural members 304 can be internal frames supporting an external skin 302. For example, the non-defective region 154 can include an area of the structure 300 supported by at least one underlying structural member 304. More preferably, the non-defective region 154 encompasses underlying structural members 304 located on opposite sides of the suspect region 158 or the nearest underlying structural members 304 on two sides of the suspect region 158, and which are not necessarily opposite sides of the suspect region 158.

In the example of the fuselage 402 of FIG. 7, the underlying structural members 304 are longerons 408 and circumferential frames 410. Other examples of underlying structural members 304 include, but are not limited to, underlying ribs (not shown) and/or spars (not shown) of a wing (FIG. 1) or a flight control surface such as an aileron, flap, horizontal stabilizer, elevator, vertical fin, rudder, etc. In some examples, the size of the non-defective region 154 can be based on the distance from the suspect region 158 to one or more underlying structural members 304 in the non-defective region 154 and which may be contributing to the defect. Sizing the template opening 130 to encompass one or more underlying structural members 304 may facilitate a determination of the effect of surface defects on one or more characteristics of the structure 300 such as the strength characteristics, aerodynamic characteristics, or other characteristics.

In FIG. 7, the 3D scanner 104 is a crossed-laser-line scanner 106, which is held by an operator (e.g., human inspector) and manipulated in a manner for scanning the physical template 122 and the localized portion 308 of the inspection surface 306 surrounded by the physical template 122. In the example shown, the crossed-laser-line scanner 106 is a T-Scan Hawk 2™ scanner commercially available from the Zeiss Group of Oberkochen, Germany. Although shown as a handheld scanner, any one of the 3D scanners 104 disclosed herein can be supported by a stationary platform (e.g., a tripod 110—FIG. 8) or a movable platform (not shown). For example, the 3D scanner 104 can be supported by a robot (not shown) or a gantry system (not shown) configured to move the 3D scanner 104 while scanning the inspection surface 306 for data capture.

Figure 8:
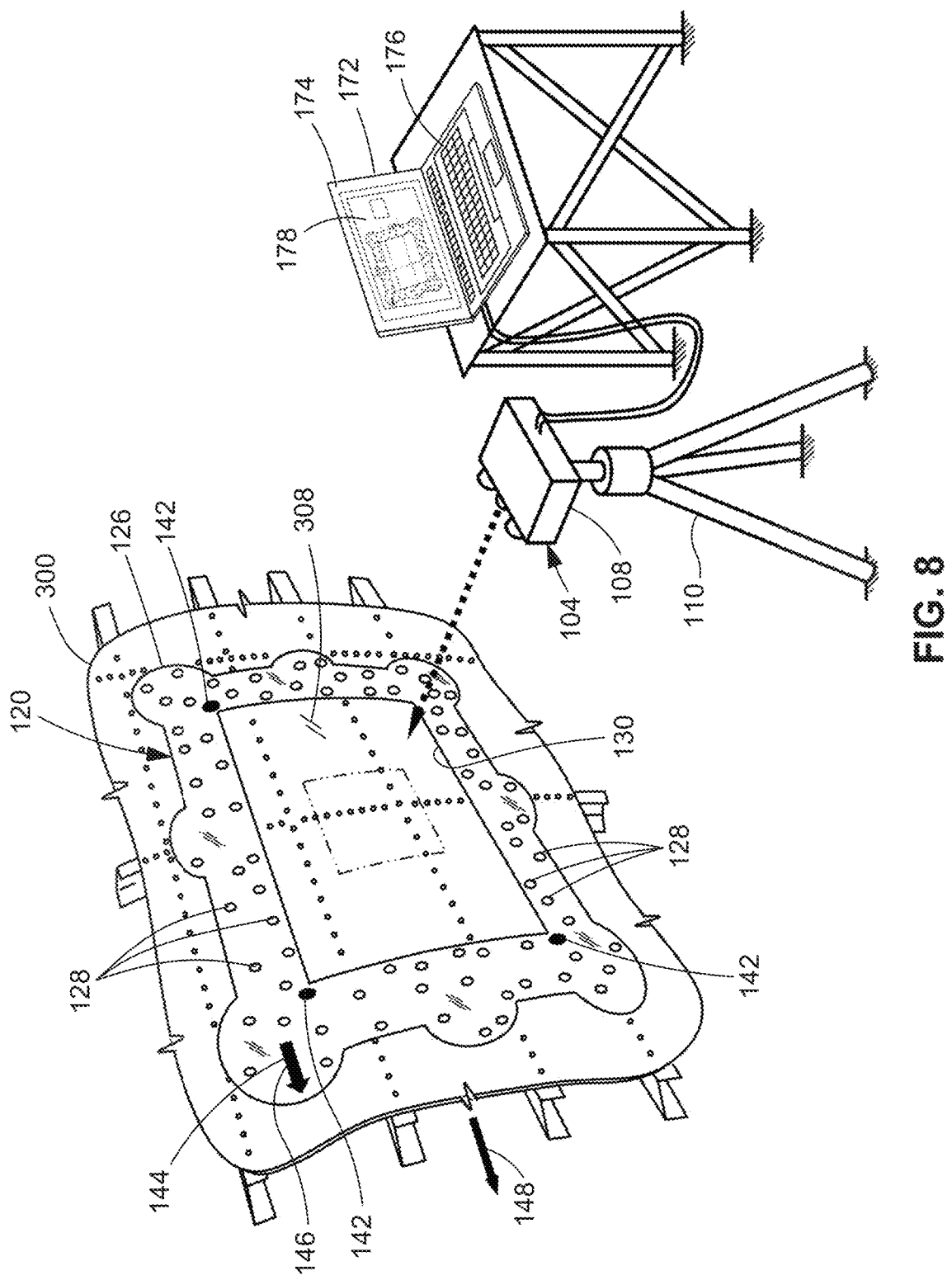
FIG. 8 shows an example of a 3D scanner configured as a structured light scanner supported on a tripod.

FIG. 8 shows an example of a 3D scanner 104 configured as a structured light scanner 108 mounted on a tripod 110. One example of a structured light scanner 108 is an ATOS™ scanner commercially available from the Zeiss Group of Oberkochen, Germany. However, the 3D scanner 104 may be provided in any one of a variety of configurations capable of digitizing the inspection surface 306, and is not limited to laser scanners. For example, the 3D scanner 104 can be provided in a configuration that uses LiDAR or photogrammetry to generate a point cloud 150 of the inspection surface 306.

In FIG. 8, the template body 126 of the physical template 122 includes a unique constellation of retroreflective targets 128 as may be required for data localization when using certain types of 3D scanners 104. The retroreflective targets 128 enable aligning and merging multiple scans of the same area but taken from different orientations of the 3D scanner 104 when scanning the inspection surface 306.

Figure 9:
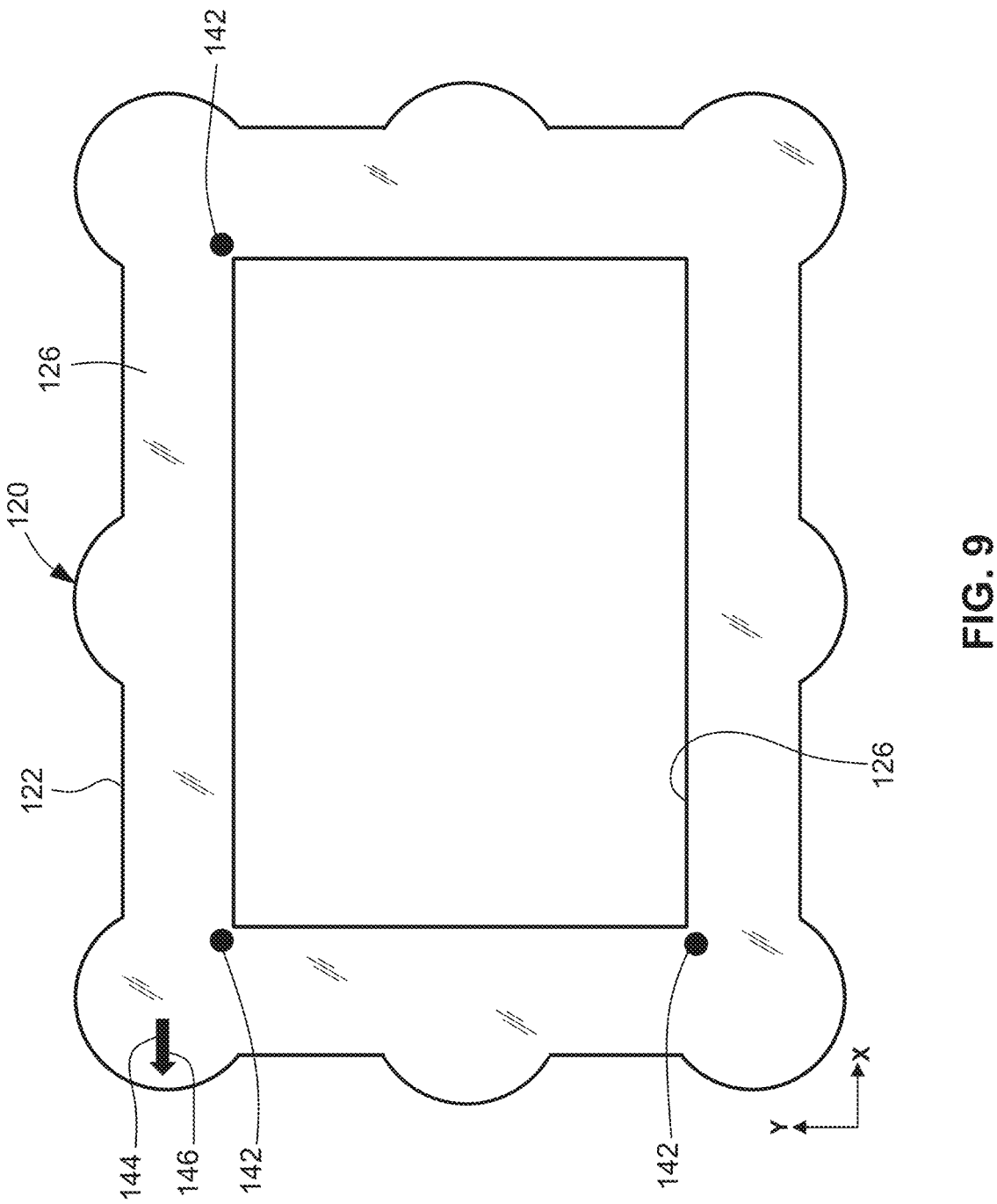
FIG. 9 is a plan view of an example of a scan template having a directional arrow for aligning the scan template with a principal direction of surface contour requirements of the fuselage, and also illustrating three alignment targets respectively at three corners of the template opening for defining the bounds (e.g., the size and shape) of a template opening for defining the orientation of the point cloud relative to the fuselage.
Figure 11:
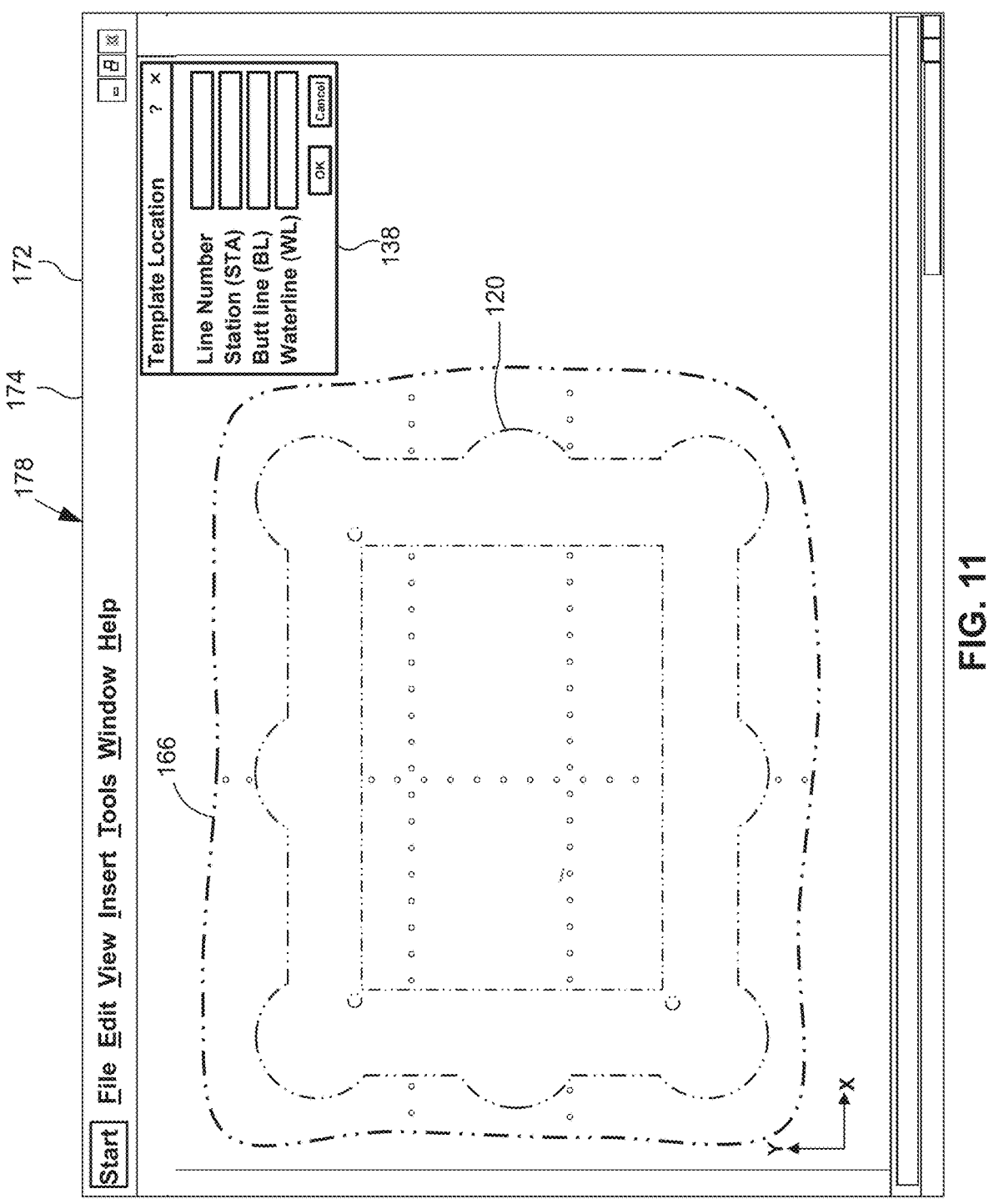
FIG. 11 shows an example of a display screen of a computing device showing a polygonized mesh representing the point cloud of FIG. 10 and further illustrating an example of a table listing the location of the scan template relative to the fuselage.

In FIGS. 7-9, the scan template 120 includes three alignment targets 142 located respectively at three of the corners of the template opening 130. The alignment targets 142 outline the bounds (e.g., the size and shape) of the template opening 130 (i.e., and the localized portion 308). In addition, the alignment targets 142 orient the scan (e.g., the point cloud 150) in a manner that is easier to observe. For example, the three alignment targets 142 allow the processor 172 to display (e.g., on a display screen 178 of a computing device 174—FIGS. 7-8) the point cloud 150 in alignment with the x and y directions indicated on the display screen, as shown in 178, as shown in FIG. 11.

In FIGS. 7-9, the scan template 120 includes an alignment feature 144 in the form of a directional arrow 146 for aligning the scan template 120 with a principal direction 148 associated with the surface contour requirements of the inspection surface 306. The principal direction 148 refers to the main or primary orientation along which the surface contour requirements are specified. For example, in the fuselage 402 of FIGS. 1-2, the principal direction 148 coincides with the centerline of the fuselage 402 and which is the general direction of airflow over the aircraft 400 during flight. The directional arrow 146 facilitates the manual positioning (via an operator) of the scan template 120 on the inspection surface 306 of the fuselage 402 such that the directional arrow 146 is pointing forward. However, the alignment feature 144 can be provided in any one of a variety of alternative configurations and is not limited to a directional arrow 146. Furthermore, the alignment feature 144 can be oriented in any one of a variety directions, and is not to be limited to be oriented parallel to a principal axis of a structure 300.

Although the above-described examples of the scan template 120 refer to a physical template 122, the scan template 120 may alternatively be provided as a projected template 124 (FIG. 7) that is projected onto inspection surface 306 by a light projector (not shown). The projected template 124 can have the same size, shape, and configuration as a physical template 122. For example, the projected template 124 can include projected elements (not shown) such as the outline of the exterior perimeter and the outline of the template opening 130 and which are projected by the light projector onto the inspection surface 306. Furthermore, the projected elements can include one or more alignment features 144 (e.g., a directional arrow 146) and/or one or more alignment targets 142. The above-noted projected elements can be captured in the point cloud 150 of the inspection surface 306 during scanning by the 3D scanner 104, to allow for downstream processing (e.g., cropping) of the portions of the point cloud 150 located outside of the localized portion 308.

As an alternative to a physical template 122 or a projected template 124 applied to the inspection surface 306, the scan template 120 can be a virtual template (not shown) incorporated into the software of the processor 172. For example, after the 3D scanner 104 scans the inspection surface 306 and generates the point cloud 150, the processor 172 can pre-process certain portions of the point cloud 150. In this regard, the processor 172 can perform a cursory review of the inspection surface 306 to locate areas (i.e., suspect regions 158) for which the curvature (e.g., depressions, bulges) exceeds a predetermined threshold (e.g., stochastic threshold, rate-of-change threshold) as described above. Upon identifying a suspect region 158 during the cursory review process, the processor 172 can center the suspect region 158 within a larger localized portion 308 that surrounds the suspect region 158, and the processor 172 then can crop, remove, or disregard portions of the point cloud 150 located outside of the localized portion 308 prior to performing the below-described localized surface fitting and deviation analysis. Advantageously, a virtual template is adaptive to the structure 300 under inspection, in the sense that the size, shape, and/or position of the localized portion 308 of the inspection surface 306 can be easily defined and adjusted via the software on which the processor 172 operates.

Figure 10:
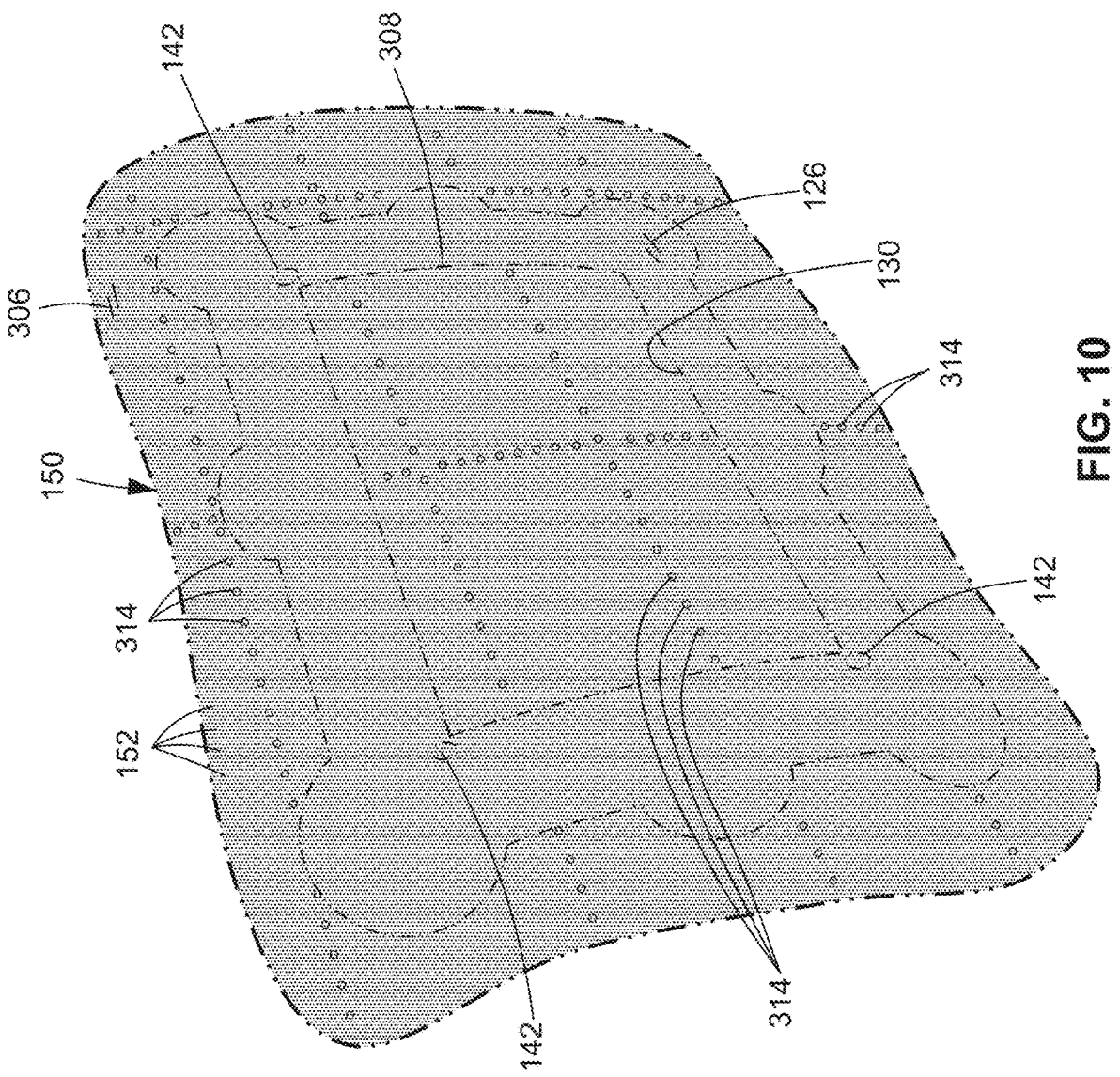
FIG. 10 is a perspective view of an example of a point cloud of the inspection surface as generated by the 3D scanner of FIGS. 7 or 8.

Referring to FIG. 10, shown is an example of a point cloud 150 of the inspection surface 306 as generated by a 3D scanner 104 such as the crossed-laser-line scanner 106 of FIG. 7 or the structured light scanner 108 of FIG. 8. FIG. 10 shows the surfaces of the scan template 120, including the outline of the template opening 13 and outer perimeter of the template body 126, and the alignment targets 142 at the three corners of the template opening 130. In addition the points 152 in the point cloud 150 capture the features of the inspection surface 306 that are not covered up by the scan template 120, including the fasteners 314.

Referring to FIG. 11, shown is an example of a display screen 178 of a computing device 174 showing a polygonized mesh 166, which represents the point cloud 150 of FIG. 10. When the processor 172 receives the point cloud 150 data from the 3D scanner 104 (FIG. 7), the processor 172 autonomously converts the point cloud 150 into the polygonized mesh 166. The polygonized mesh 166 is comprised of edges (not shown) that interconnect the points 152 of the point cloud 150 to form a plurality of polygonal elements such as triangular elements or quadrilateral elements. In the present disclosure, the terms polygonized mesh 166 and point cloud 150 are interchangeable.

Figure 12:
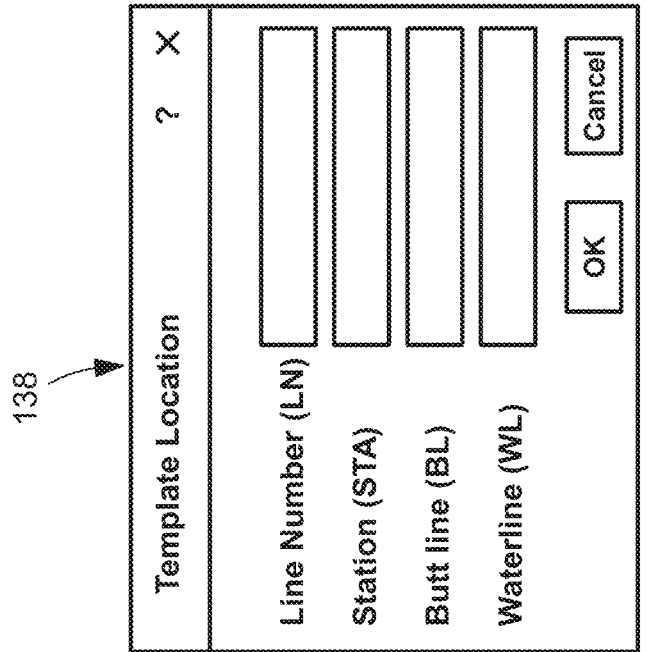
FIG. 12 is a magnified view of the table of the scan template location data of FIG. 7.

FIG. 12 shows a table of template location data 138 of FIG. 11 identifying the location of the scan template 120 on the structure 300 for data localization of the 3D scan data on the structure 300. In the example shown, the template location data 138 includes terms that are typical of aircraft production, including line number (the unique aircraft identifier in a production line), station number (longitudinal location of the aircraft), butt line (lateral location), and water line (vertical location). However, any one of a variety of alternative terms can be used for the template location data 138 of a scan template 120 on a structure 300 (i.e., data localization), and are not limited to the above-noted terms used in aircraft production. In another example, the scan template 120 data can be provided terms of x, y, z coordinates relative to a known reference origin 140 (FIG. 1) or a hardpoint on the aircraft 400. In addition to the template location data 138, any one of a variety other types of metadata can be included. For example, the name of the operator, date, and temperature can be included with the template location data 138.

In some examples of the surface inspection system 100, the template location data 138 and other metadata can be manually entered, such as by the operator of the 3D scanner 104. Manual entry relies on accurate knowledge by the operator of the arrangement of the structure 300. As an alternative to manual entry, a template locating system (not shown) can capture the location of the scan template 120 relative to the structure 300 before, during, or after scanning of the inspection surface 306 by the 3D scanner 104.

In one example, the template locating system can be provided as an indoor tracking system (not shown) that tracks the location of the scan template 120 relative to the structure 300 and automatically records the template location data 138 when a scan is initiated. In one example, the indoor tracking system can be a local positioning system in which small transceivers (not shown) are mounted on the scan template 120 and which communicate with a plurality of transmitters (not shown) installed at fixed locations in the environment around the structure 300. In another example, the template locating system may be comprised of a network of infrared cameras (not shown) in the surrounding environment and/or ultrasonic beacons (not shown) mounted on the scan template 120 to track and record its position relative to the structure 300. In still another example, the template locating system can include one or more laser trackers (not shown) in the surrounding environment, and one or more spherical reflectors mounted on the scan template 120. When the scan template 120 is positioned on a structure 300, the laser trackers emit a laser beam which is reflected back to the laser trackers, allowing the laser trackers pinpoint the three-dimensional location of the spherical reflector on the structure 300. In another example, one or more laser tracker or a videogrammetry system could monitor the location of the 3D scanner 104 relative to the structure 300 as the 3D scanner 104 is moved around the structure 300 during the scanning process. If the 3D scanner 104 is mounted on an articulating arm (not shown) or a robotic device (not shown), data localization can be achieved via laser tracking of the position of the 3D scanner 104, or via kinematic tracking using the known geometry of the arm(s) and joint angles.

Regardless of the method used to input the template location data 138 for data localization of the scan data, knowledge of the location of the scan template 120 on the structure 300 (e.g., aircraft 400) is important so that if a surface defect is discovered during analysis of the inspection data, the surface defect can be located on the structure 300 and corrected. Furthermore, the template location data 138 is important because surface contour requirements for one location on a structure 300 can differ from the surface contour requirements of other locations. In addition, knowledge of the template location data 138 is important for proper record keeping and/or for maintaining the above-mentioned digital thread of the as-built structure 300.

Figure 13:
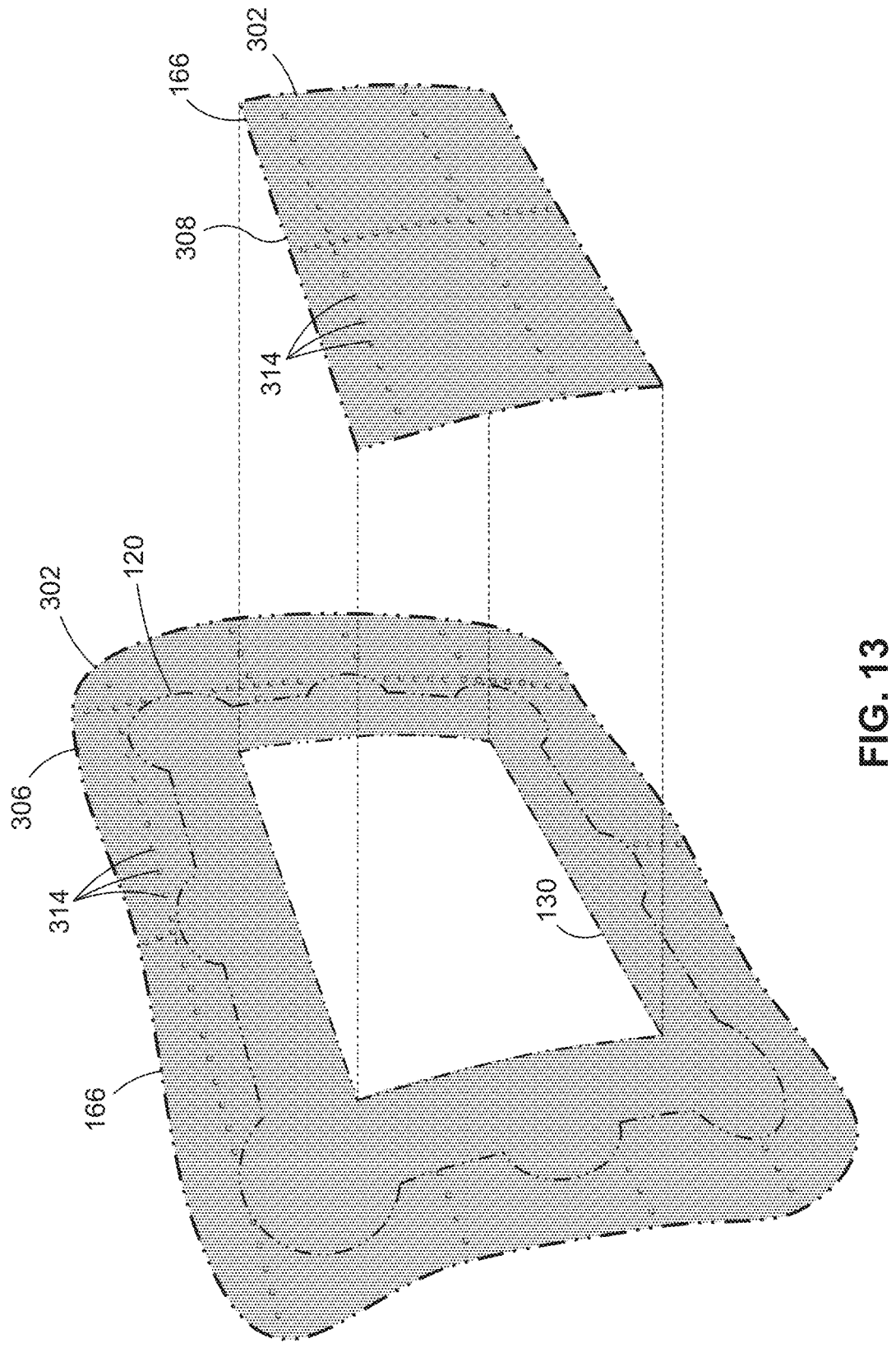
FIG. 13 is a perspective view of the polygonized mesh of FIG. 11 showing a localized portion of the inspection surface as defined by the scan template, and which is shown separated from the remainder of the polygonized mesh.
Figure 14:
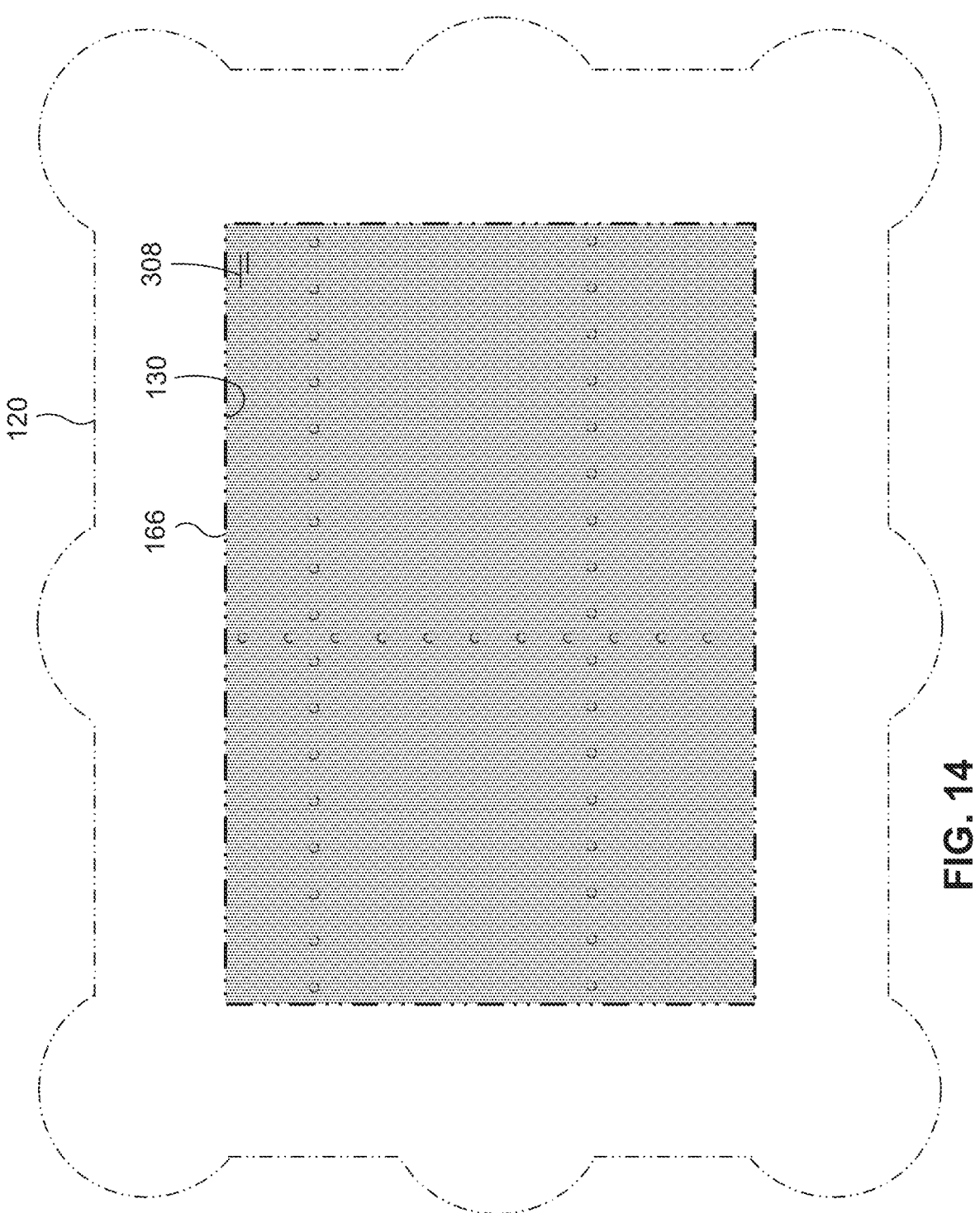
FIG. 14 is a plan view of the polygonized mesh of the point cloud of the localized portion of FIG. 13.

Referring to FIG. 13, shown is the polygonized mesh 166 of FIG. 11 and illustrating the localized portion 308 of the inspection surface 306 separated from the remainder of the polygonized mesh 166. As shown in the figures, the localized portion 308 is defined by the template opening 130 of the scan template 120. In the example shown, the fasteners 314 in the skin 302 of the inspection surface 306 are shown for reference in the polygonized mesh 166 of the localized portion 308. FIG. 14 is a plan view of the polygonized mesh 166 of the localized portion 308 of FIG. 13 showing the template opening 130 which defines the size and shape of the localized portion 308.

Figure 15:
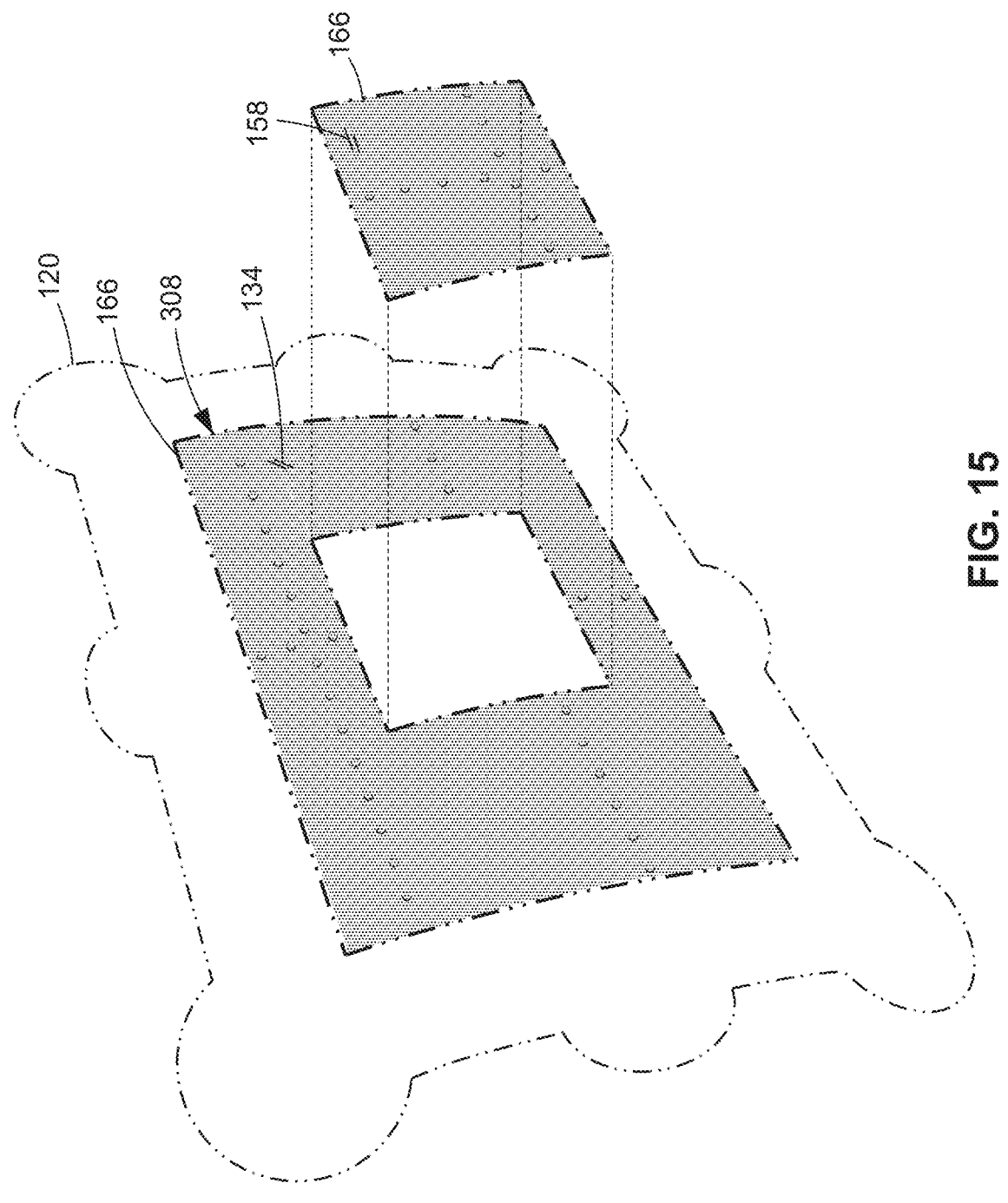
FIG. 15 is a perspective view of the localized portion of the polygonized mesh of FIG. 14 separated into two regions including a non-defective region and a suspect region, and the suspect region is surrounded by the non-defective region and potentially contains points representing defects in the suspect region of the inspection surface.
Figure 16:
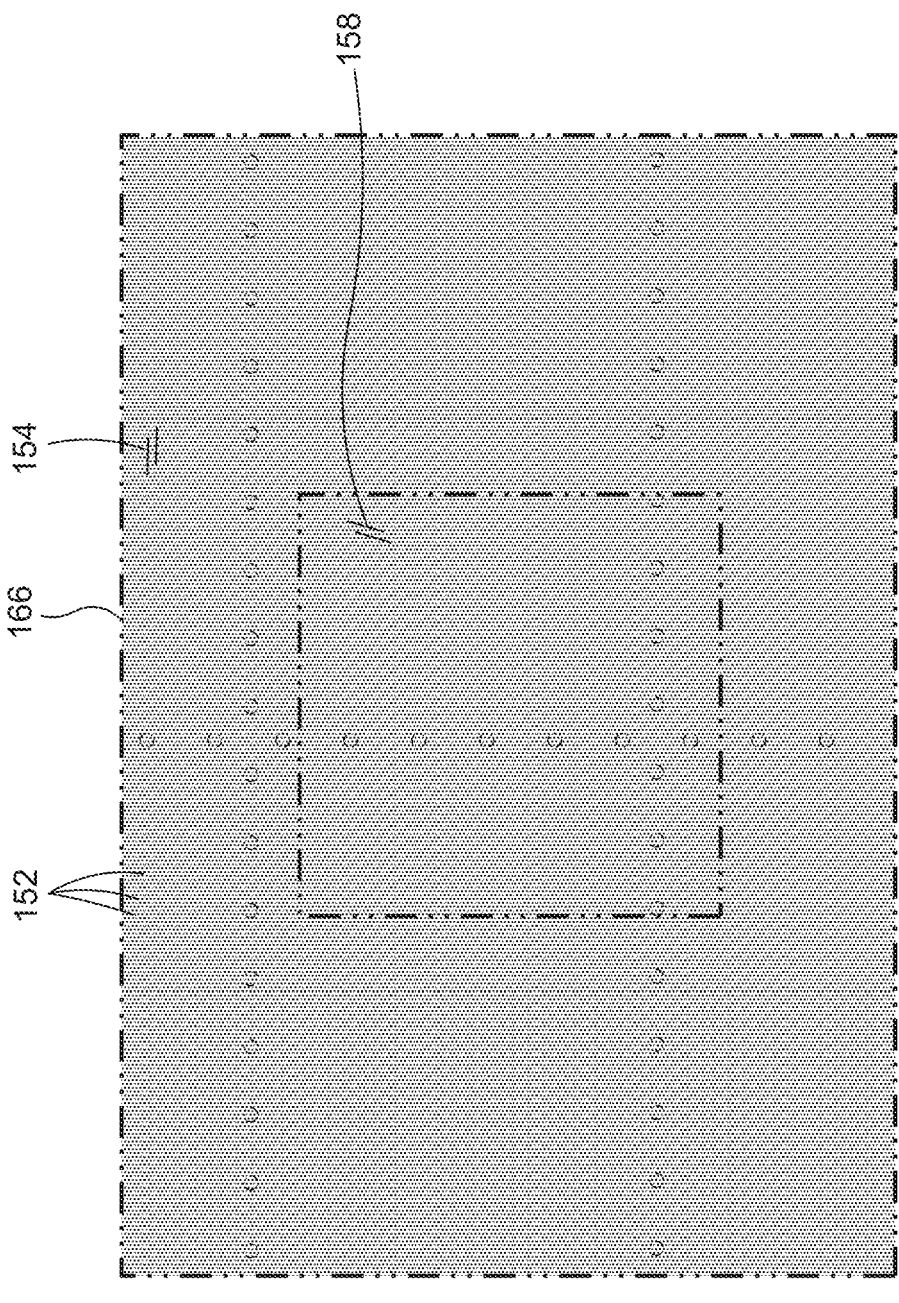
FIG. 16 is a plan view of the polygonized mesh of the non-defective region of FIG. 15.
Figures 17, 18:
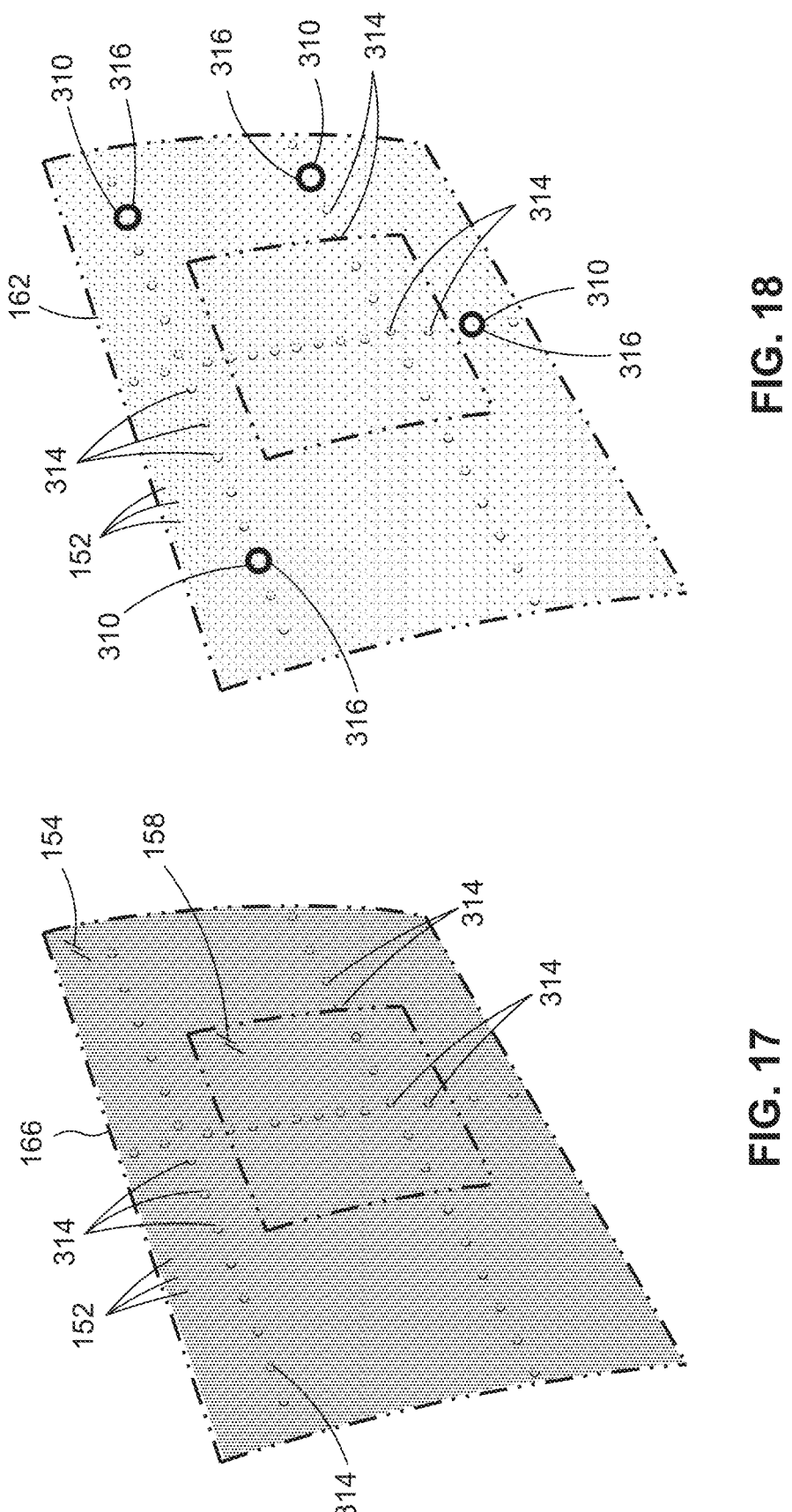
FIG. 17 is a perspective view of the polygonized mesh of the non-defective region of FIG. 16.
FIG. 18 is a perspective view of a well-ordered grid of points generated as a best fit to the arrangement of points in the point cloud of the localized portion, and showing the location of several surface discontinuities (e.g., fastener pits—shown circled) in the inspection surface.

Referring to FIG. 15, shown is the localized portion 308 of the polygonized mesh 166 of FIG. 14 and which is separated into two regions including a non-defective region 154 and a suspect region 158. FIGS. 16-17 show the polygonized mesh 166 of the non-defective region 154. The suspect region 158 is surrounded by the non-defective region 154 and contains points 152 potentially representing defects in the suspect region 158 of the inspection surface 306. As mentioned above, the non-defective region 154 is presumed to be substantially free of significant defects.

FIG. 18 shows an example of a well-ordered grid 162 of points 152 in the localized portion 308 that are a best fit to the loose, unstructured arrangement of points 152 in the point cloud 150 of FIG. 17. As described below, the well-ordered grid 162 is used for identifying surface discontinuities 310 in the inspection surface 306. FIG. 18 shows the locations of the fasteners 314 in the skin 302 of the inspection surface 306, some of which have been identified as surface discontinuities 310 in the form of fastener pits 316 (shown circled).

Figures 19, 20:
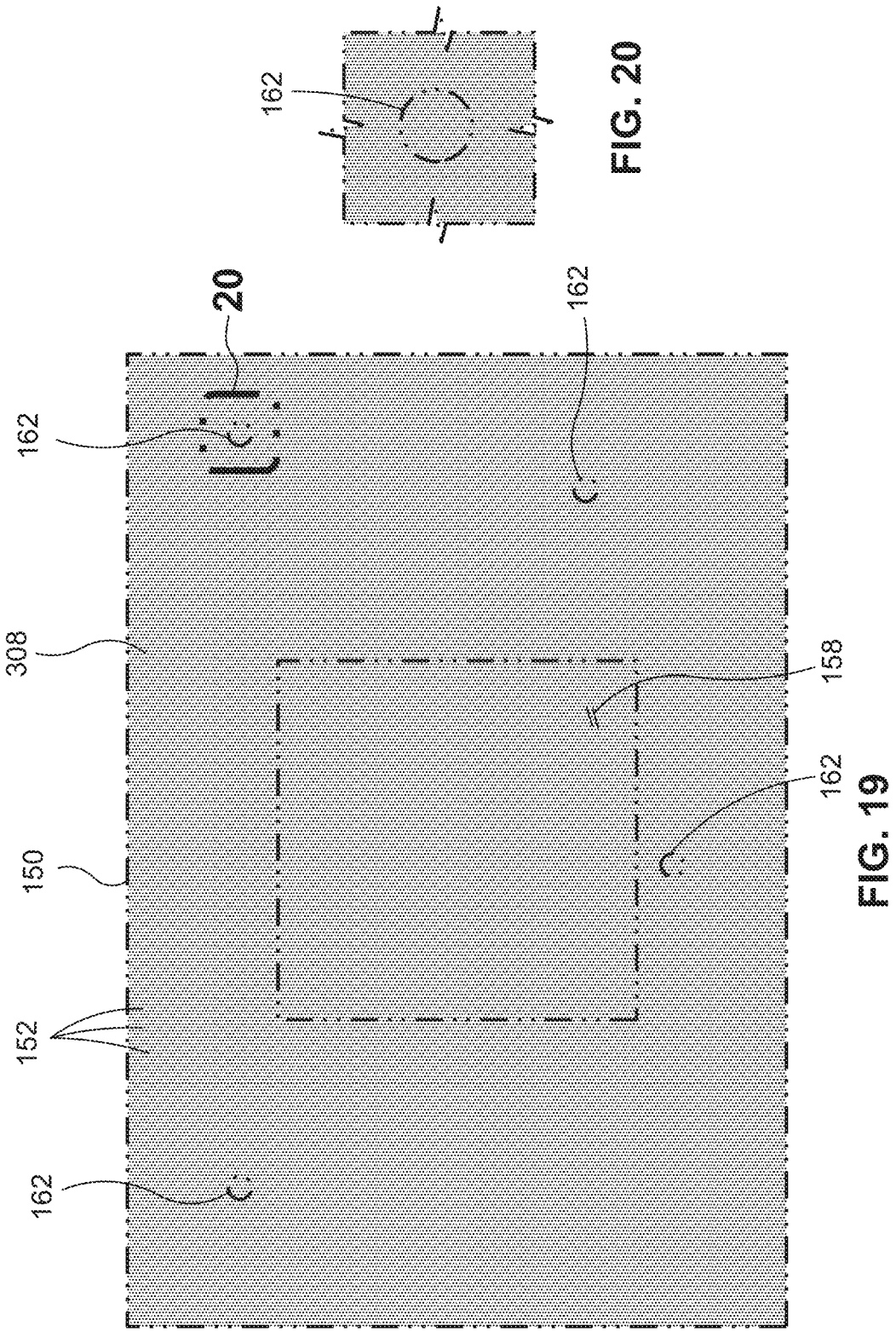
FIG. 19 is a plan view of the point cloud of the localized portion excluding the points representing the suspect region and excluding the points representing the surface discontinuities (e.g., fastener pits) identified via the well-ordered grid of FIG. 18.
FIG. 20 is a magnified view of a portion of the point cloud of FIG. 19 showing an example of the exclusion of points one of the surface discontinuities shown in FIG. 19.

FIG. 19 is a plan view of the point cloud 150 of the localized portion 308 illustrating the surface discontinuities 310 (e.g., fastener pits 316) identified via the well-ordered grid 162 of FIG. 18. FIG. 20 is a magnified view of a portion of the point cloud 150 of FIG. 19 showing one of the surface discontinuities 310. Although not shown in FIGS. 19-21, the point cloud 150 from which the reference surface 164 (FIG. 22) is generated disregards scan noise (e.g., sensor noise) generated during the process of scanning the inspection surface 306 with the 3D scanner 104.

Figures 21, 22:
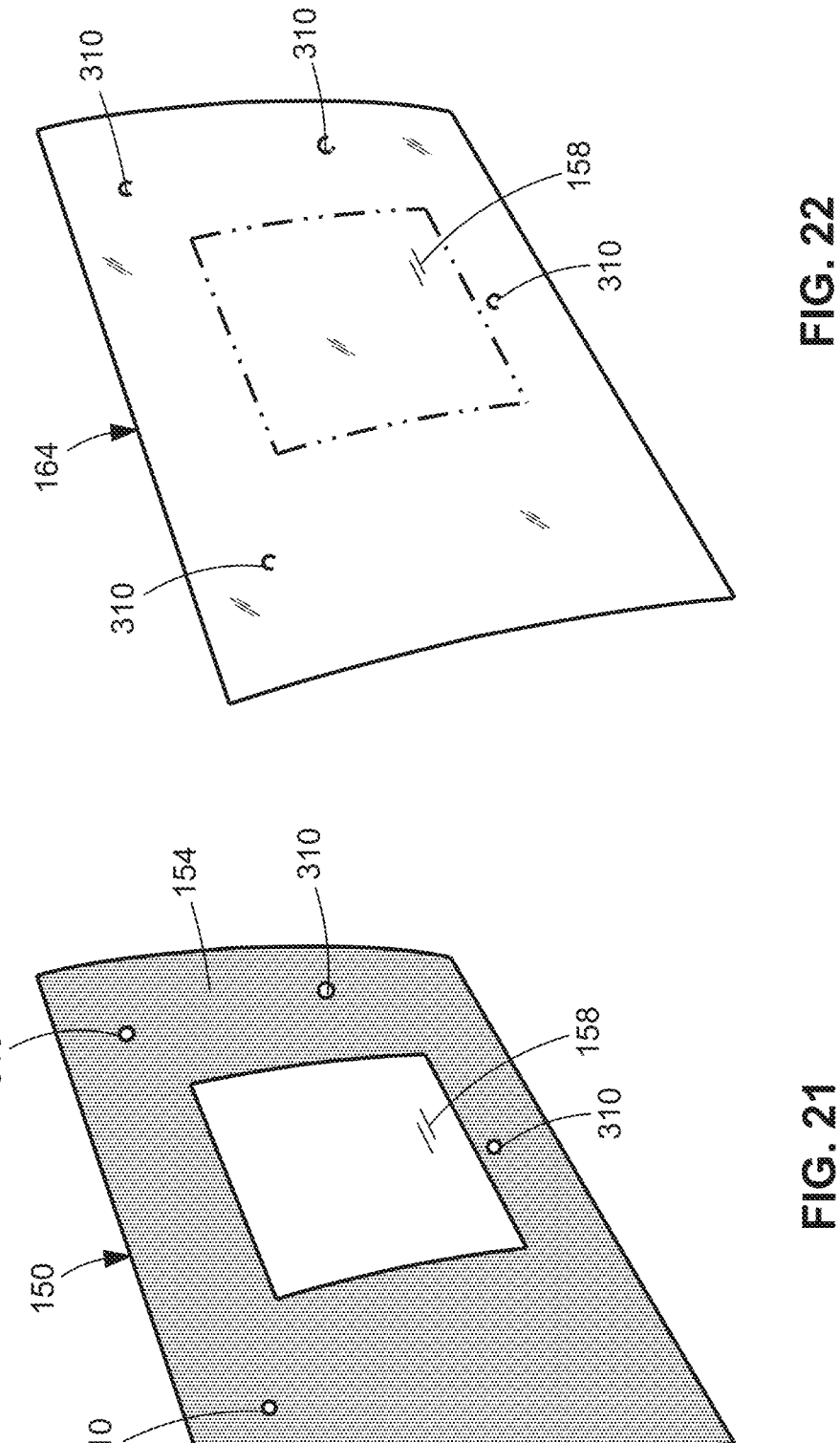
FIG. 21 is a perspective view of the point cloud of FIG. 19.
FIG. 22 is a perspective view of a reference surface generated as a polynomial fit of the point cloud of FIG. 19 and which is continuous across the suspect region and across the surface discontinuities.
Figure 23:
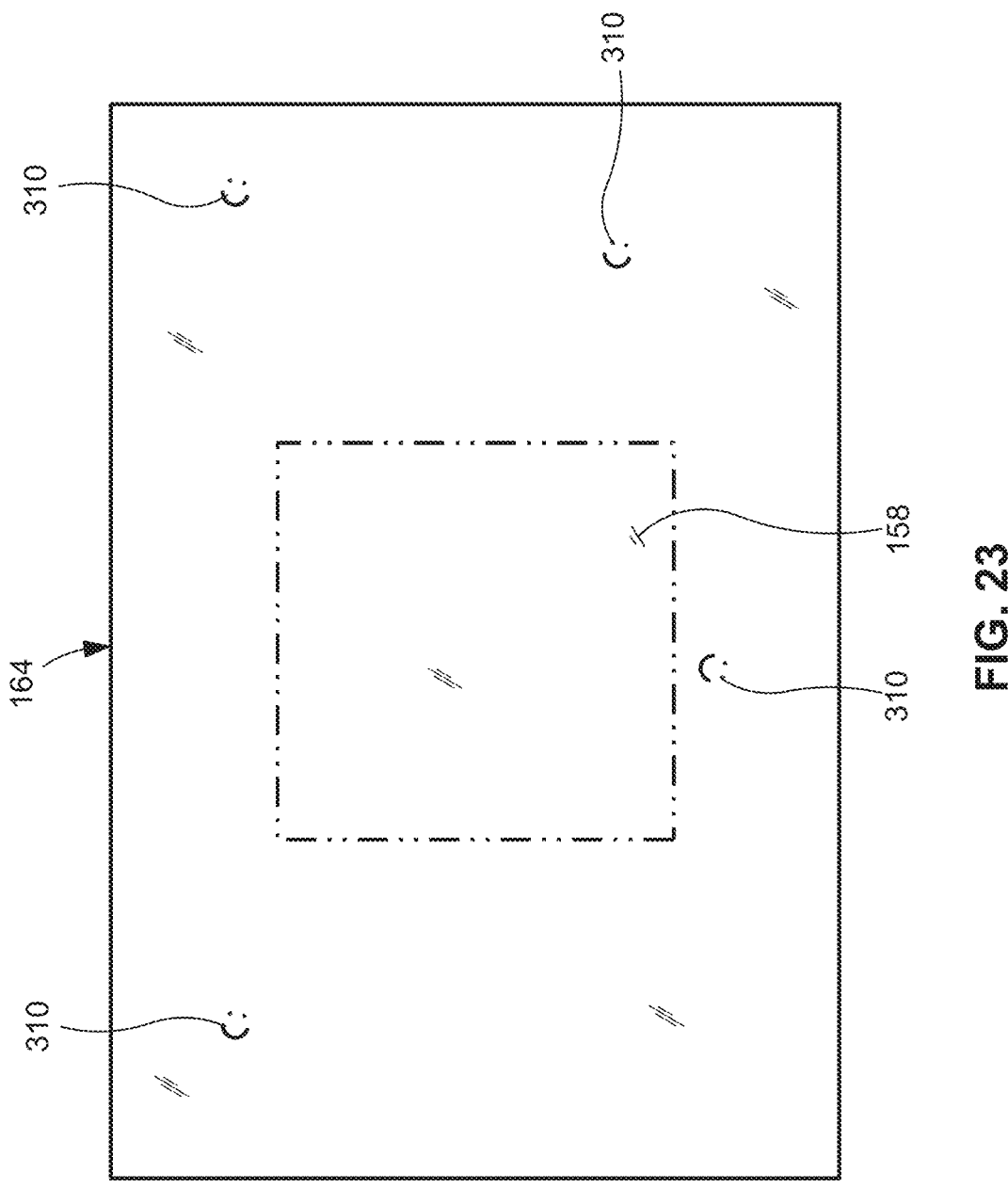
FIG. 23 is a plan view of the reference surface of FIG. 22.

FIGS. 22-23 show an example of the reference surface 164 based on the points 152 of the point cloud 150 shown in FIG. 21. As mentioned above, the processor 172 establishes the reference surface 164 based on the points 152 that represent the non-defective region 154, and exclusive of the points 152 that represent the suspect region 158. In some examples, scan noise is disregarded when establishing the reference surface 164. In some examples, surface discontinuities 310 are disregarded when establishing the reference surface 164. The reference surface 164 is a mathematical function (i.e., a non-discrete representation of a surface) which extends across the suspect region 158 and across the surface discontinuities 310. In other words, the points 152 representing the suspect region 158 and the surface discontinuities 310 are not used to establish the reference surface 164. However, the reference surface 164 is continuous across the suspect region 158 and the surface discontinuities 310, as shown in FIGS. 21-22.

Prior to establishment of the reference surface 164, the processor 172 is configured to identify the points 152 in the point cloud 150 that represent surface discontinuities 310 in the inspection surface 306. Surface discontinuities 310 can be described as significant deviations or abrupt changes in the expected shape of the inspection surface 306. Significant deviations can include as-designed discontinuities in the inspection surface 306 such as lap joints 312 (FIG. 2) and section joins 406 (FIG. 2) of a structure 300. Lap joints 312 occur where two skin 302 panels overlap each other (e.g., FIG. 2), resulting in a sharp step in the inspection surface 306. A section join 406 is the interface between two end-to-end barrel sections 404 of a fuselage 402, as shown in FIG. 2. Significant deviations can also include as-built discontinuities such as fastener pits 316 (FIGS. 17-18) in the inspection surface 306. A fastener 314 pit can be described as a relatively deep pocket surrounding a rivet head. As may be appreciated, surface discontinuities 310 are not limited to lap joints 312, section joins 406, or fastener pits 316, and can comprise any one of a variety of different types of surface features where there is a significant deviation in the expected shape of the inspection surface 306.

The process of identifying surface discontinuities 310 comprises generating the above-described well-ordered grid 162 (FIG. 18) of uniformly spaced points 152 by interpolation of the loosely-structured points 152 in the point cloud 150 that represent the entire localized portion 308, including the non-defective region 154 and the suspect region 158. The well-ordered grid 162 is comprised of points 152 arranged in uniformly-spaced rows and columns with relatively fine spacing, such as ⅛ inch spacing. The processor 172 also generates a baseline surface (i.e., an initial reference surface-not shown) as a polynomial surface fit of all the points 152 in the raw point cloud 150 data (FIG. 17) of the localized portion 308, including the non-defective region 154 and the suspect region 158. The processor 172 then compares each point of the well-ordered grid 162 to the baseline surface to determine a height value for each point of the well-ordered grid 162 relative to the baseline surface. The height value of each point is converted to a grayscale pixel intensity value of from 0 to 255. The conversion of each point in the well-ordered grid 162 to a grayscale pixel intensity value results in an image (not shown) of the localized portion 308.

By converting the point cloud 150 of the localized portion 308 to an image, the processor 172 is able to perform any one of a variety of well-known image processing techniques to detect surface discontinuities 310. For example, the processor 172 can use OpenCV methods of edge detection (e.g., Canny edge detection) and contour mapping (i.e., contour detection) to identify the points 152 with the sharpest or most abrupt changes in pixel intensity. Abrupt changes in pixel intensity represent the location of sharp deviations or surface discontinuities 310 in the inspection surface 306. The location of the points 152 in the image that represent the surface discontinuities 310 are then traced back to the corresponding points 152 in the point cloud 150 of the localized portion 308, and these corresponding points 152 are then disregarded when establishing the reference surface 164.

The above-described process of comparing the points 152 in the well-ordered grid 162 to the baseline surface also facilitates the identification of points 152 in the point cloud 150 that represent scan noise. Scan noise can be described as random deviations in the height of some of the points 152 in the point cloud 150, and can be the result of environmental factors such as lighting, vibrations, and surface reflectivity, and/or the result of characteristics of the 3D scanner 104 such as calibration issues or sensor resolution. Advantageously, the exclusion of points 152 representing scan noise and surface discontinuities 310 when establishing the reference surface 164 improves the accuracy with which the reference surface 164 is constructed. The improved accuracy of the reference surface 164 avoids false positive indications when analyzing the suspect region 158 for surface defects as described below.

The processor 172 establishes the above-described reference surface 164 by performing a surface fit of the points 152 in the point cloud 150 of the non-defective region 154 only (i.e., and not the suspect region 158) after disregarding scan noise and surface discontinuities 310. The reference surface 164 can be established using any one of a variety of surface fitting techniques such as polynomial surface fitting.

In the above-described example of a fuselage 402 (FIGS. 1-2), the reference surface 164 can be established using third order polynomial surface fitting for use with aircraft surfaces that have third order behavior in response to loads on the aircraft 400. However, a different mathematical function such as a different order polynomial fit (e.g., first or second order polynomial surface fitting) may be used for establishing the reference surface 164 of a structure 300 having a different order of behavior (e.g., first or second order behavior). As an alternative to polynomial surface fitting, the reference surface 164 can be established using any one of a variety of surface filtering techniques. For example, the reference surface 164 can be established using Gaussian, Robust Gaussian, or Surface Normal Gabor Filtering.

Although the above-described example for generating a reference surface 164 of the localized portion 308 disregards the suspect region 158, surface discontinuities 310, and scan noise, in other examples not shown, a reference surface 164 of the localized portion 308 can potentially be generated by disregarding only the suspect region 158, and not disregarding scan noise and/or not disregarding surface discontinuities 310.

Figure 24:
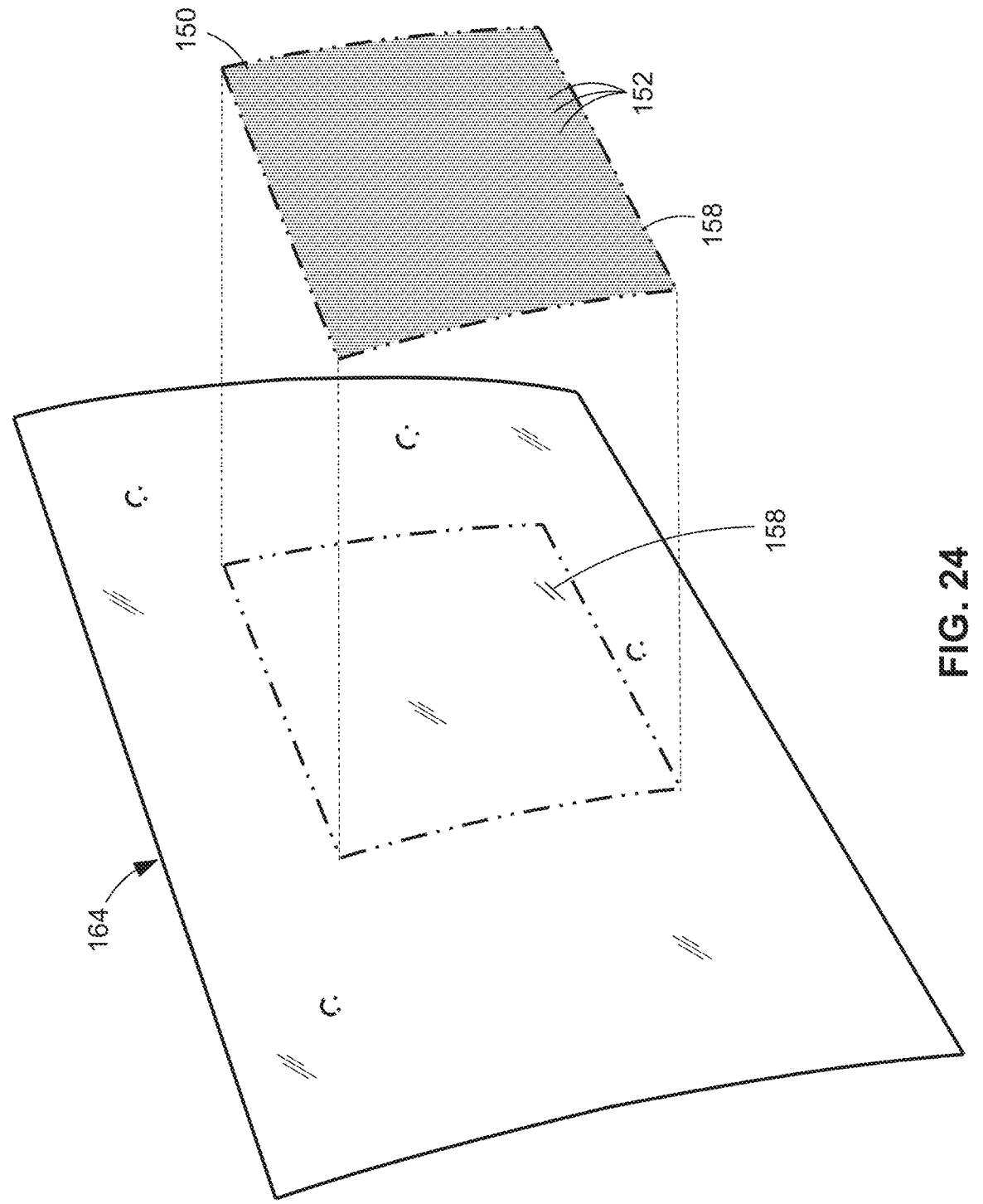
FIG. 24 is a perspective view of the reference surface and showing the point cloud of the suspect region separated away from the reference surface.
Figure 25:
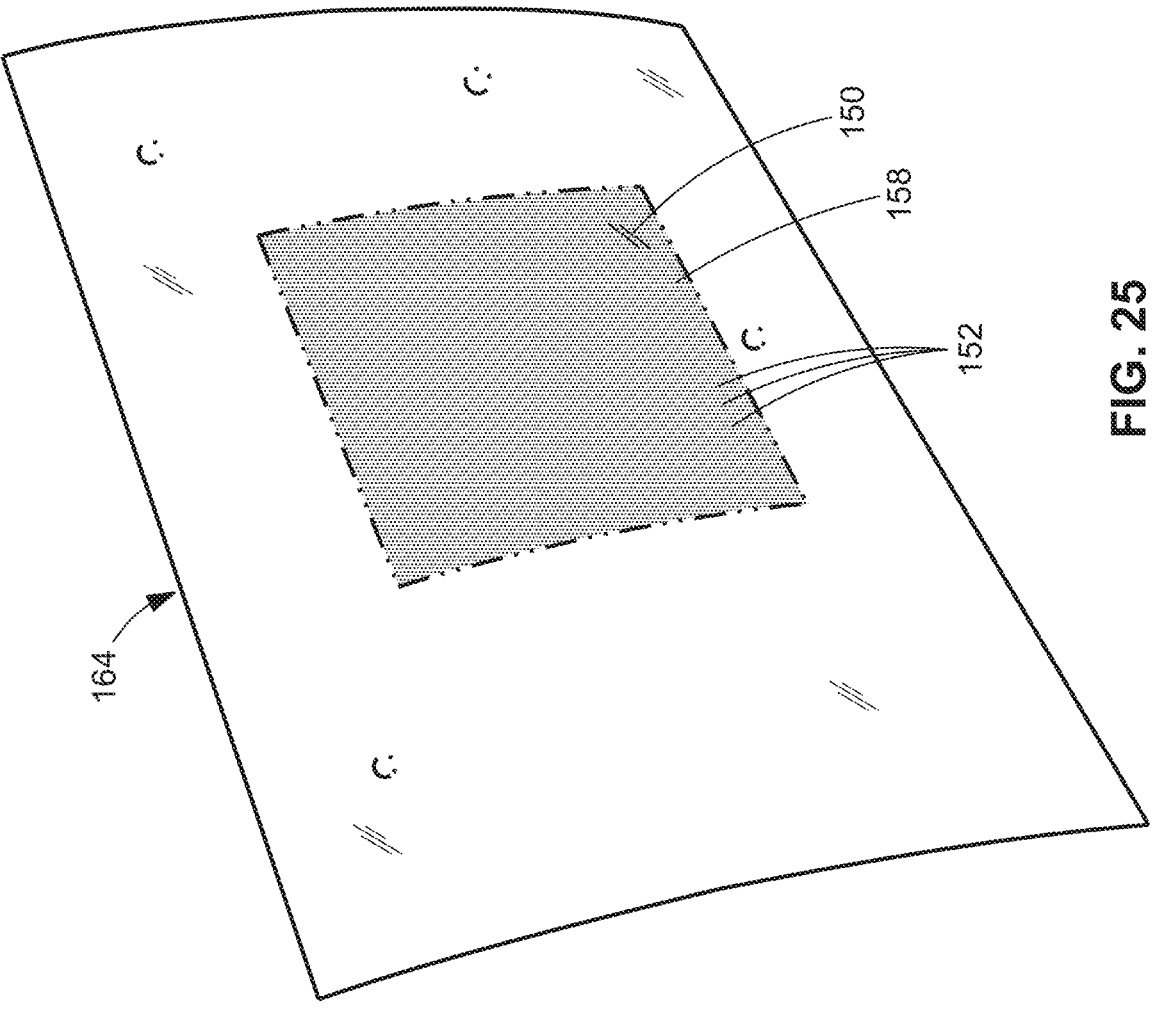
FIG. 25 shows the point cloud of the suspect region superimposed on the reference surface.

Referring now to FIGS. 24-25, shown in FIG. 24 is the reference surface 164, and the point cloud 150 of the suspect region 158 separated away from the reference surface 164. FIG. 25 shows the point cloud 150 of the suspect region 158 superimposed on the reference surface 164, representing the operation of the processor 172 in comparing the point cloud 150 of the suspect region 158 to the reference surface 164 as a means to determine one or more characteristics of the shape of the point cloud 150 of the suspect region 158 relative to the portion of the reference surface 164 within the suspect region 158. The comparison of the point cloud 150 of the suspect region 158 to the reference surface 164 can be performed in a manner similar to the above-described process of comparing the well-ordered grid 162 of the localized portion 308 to the baseline surface of the localized portion 308.

Figure 26:
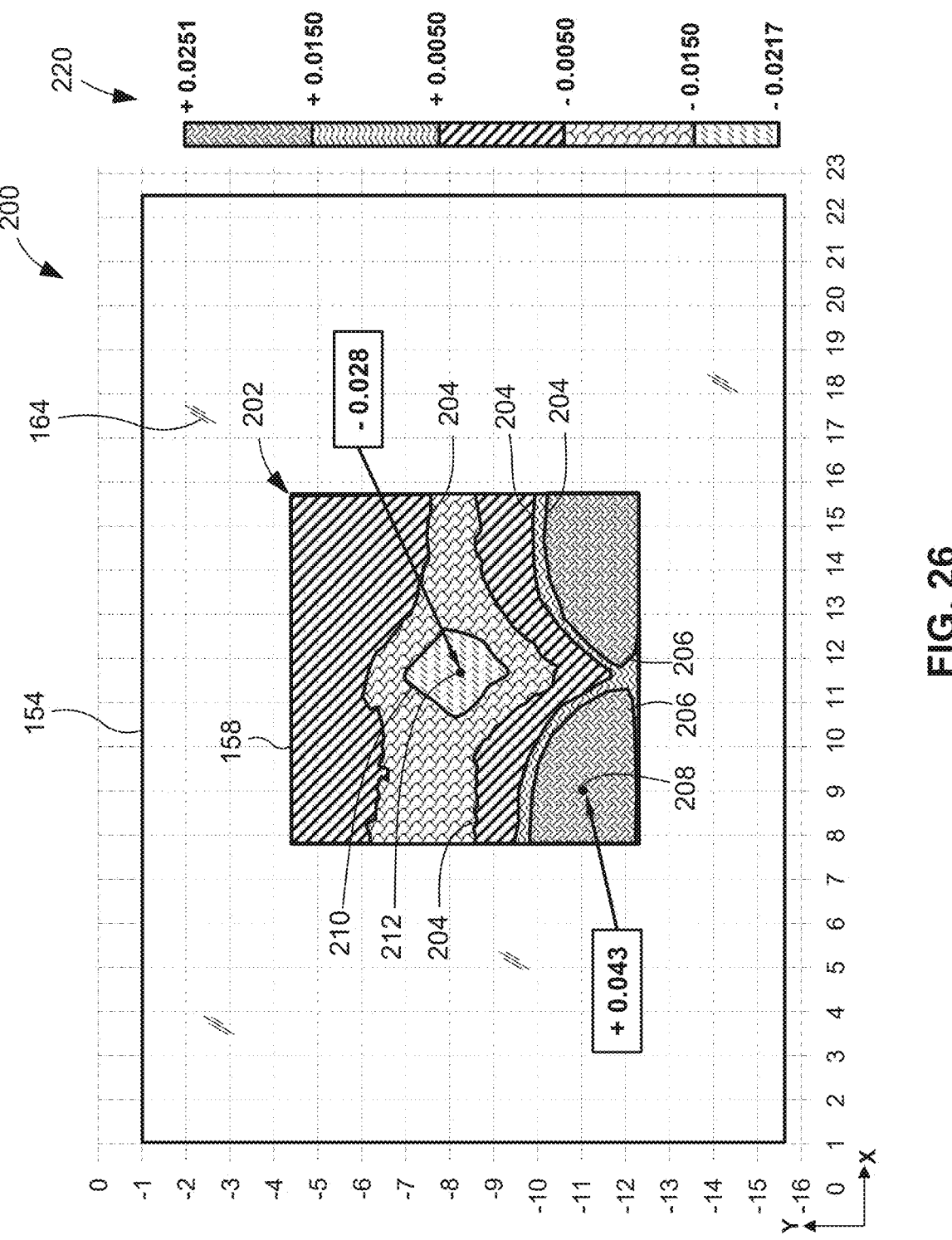
FIG. 26 shows an example of a heatmap of the suspect region surrounded by the point cloud of the non-defective region, and the heatmap (e.g., a difference map) graphically illustrates the surface contours of the suspect region relative to the reference surface and also shows the location and height of the highest point and the location and depth of the lowest point in the suspect region.

Referring to FIG. 26, shown is an example of a difference map, referred to herein as a heatmap 202, of the suspect region 158 generated as a result of the comparison of the point cloud 150 (i.e., the raw point cloud data) of the suspect region 158 to the reference surface 164 in the suspect region 158. In the example shown, the heatmap 202 of the suspect region 158 is surrounded by the reference surface 164 of the non-defective region 154. In FIG. 26, the heatmap 202 and the reference surface 164 are shown superimposed on a grid to facilitate identifying the location of the surface characteristics identified in the heatmap 202. The heatmap 202 shows surface contours 204 of the suspect region 158 relative to the reference surface 164. On the right hand side of the image is a deviation legend 220 containing cross hatching and corresponding deviations values of the suspect region 158 relative to the reference surface 164.

The processor 172 is configured to generate the heatmap 202 and determine one or more characteristics of the shape of the suspect region 158 relative to the reference surface 164. For example, when comparing the point cloud 150 (i.e., the raw scan data) of the suspect region 158 to the reference surface 164, the processor 172 is configured to determine the location and height of the highest point 208 in the suspect region 158. The highest point 208 is located in a bulge 206 in the suspect region 158. In the example shown, the highest point 208 is +0.0251 linear units above the reference surface 164. Alternatively or additionally, the processor 172 is configured to determine the location and depth of the lowest point 212 in the suspect region 158, which is located in a depression 210 in the suspect region 158. In the example shown, the lowest point 212 is −0.0217 linear units below the reference surface 164.

Figure 27:
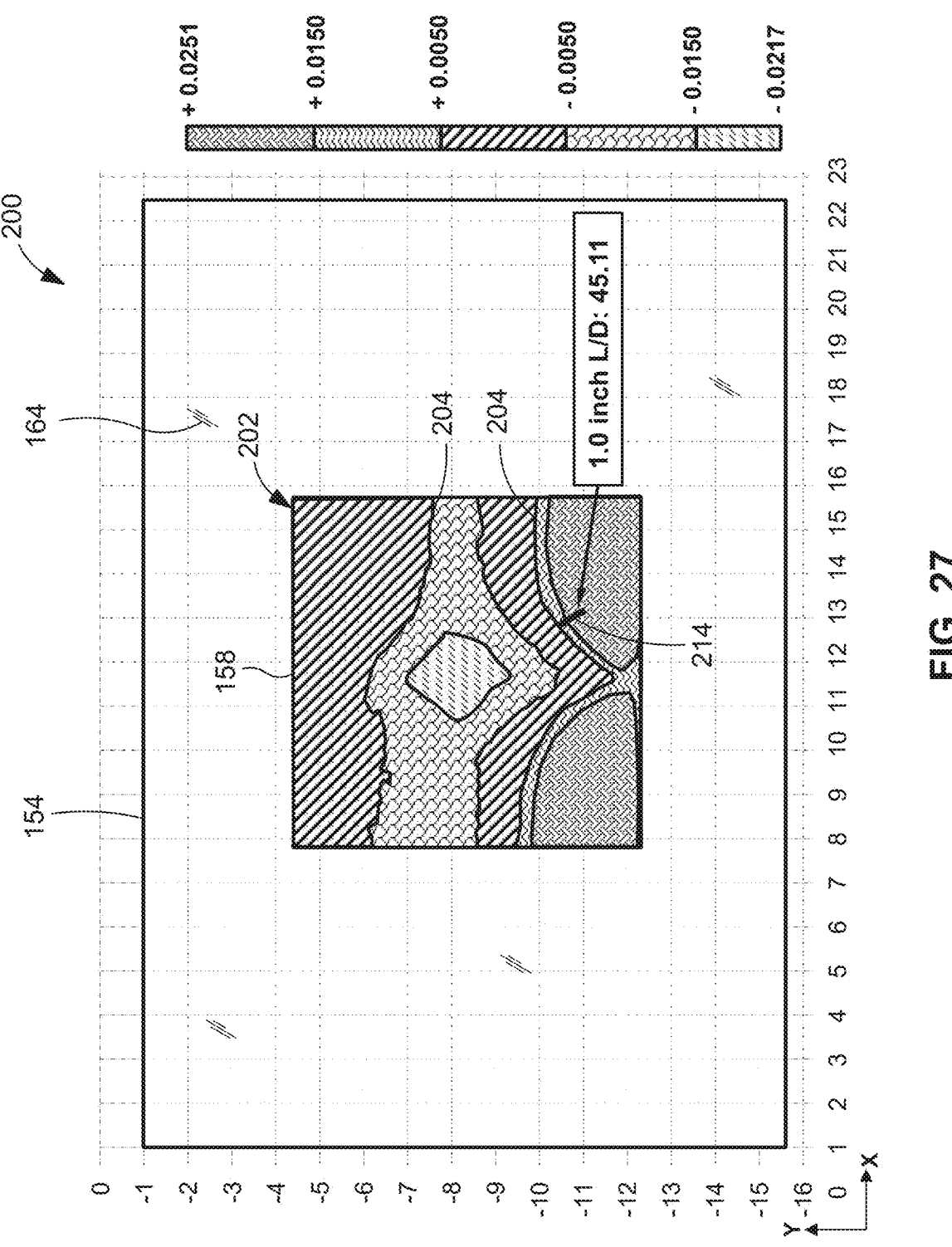
FIG. 27 shows an example of a heatmap of the suspect region showing the orientation and magnitude of the steepest slope gradient.

Referring to FIG. 27, shown is an example of heatmap 202 having the same surface contours 204 as the heatmap 202 of FIG. 26. Instead of indicating the highest point 208 and lowest point 212 as in FIG. 26, FIG. 27 shows the location and orientation of the steepest slope gradient 214 (i.e., the largest surface rate of change) in the suspect region 158 as determined by the processor 172. In the example shown, the steepest slope gradient 214 is expressed as the ratio of length L to depth D, and provides a numerical measure of the steepness of a slope.

advantageously, identification of the steepest slope gradient facilitates analysis of the shape of the suspect region 158 for its effects on the structure 300. For example, knowledge of the location and magnitude of the slope gradients of a surface can be an important characteristic as slope gradients can affect the magnitude of mechanical stress and/or strain in the material of the structure 300 in the static or unloaded state (e.g., no passengers or cargo in the fuselage 402). Additionally, knowledge of the location and magnitude of the slope gradients of a surface can help in determining how the shape of the surface influences behavior of air flow over the surface (i.e., the aerodynamics). In addition, the slope gradients of a surface can affect the aesthetics or visual appeal of the surface, which can influence customer confidence in the quality of the delivered product.

Figure 28:
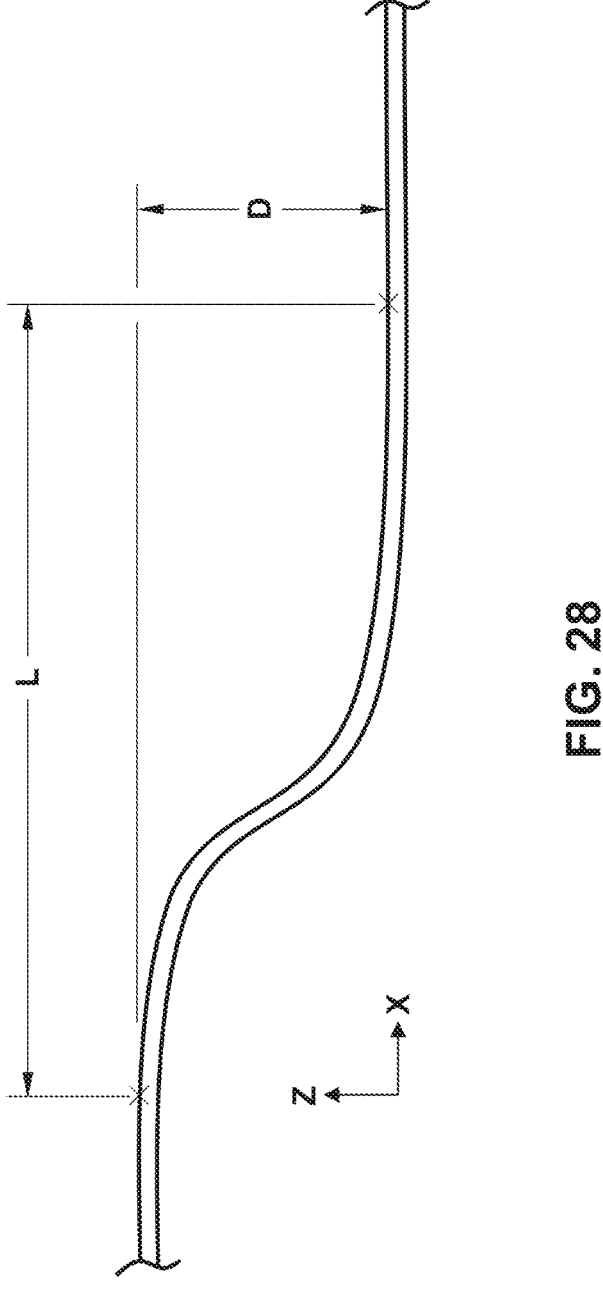
FIG. 28 shows an example of a cross-sectional profile and the length (L) and depth (D) dimensions that are used for calculating the rate of change of the cross-sectional profile.

As shown in FIG. 28, the depth D is the change in elevation between two locations or points, and is measured in a direction parallel to the local z direction of the suspect region 158 (i.e., the "vertical" distance). The length L is the distance between the two points locations measured in a direction parallel to the local x direction (i.e., the "horizontal" distance). As an alternative to expressing the steepest slope gradient 214 as an L/D ratio as shown in FIGS. 27, 29, 30, and 36, the steepest slope gradient 214 can be expressed as the ratio of depth D to length L (i.e., D/L).

In the present disclosure, the processor 172 is configured to identify the steepest slope gradient 214 within the suspect region 158 by calculating deviation values between the raw point cloud 150 data (FIGS. 24-25) and the reference surface 164 (FIGS. 24-25). The deviation values are converted into local z coordinates, and the partial derivatives of the z coordinate with respect to the x and y coordinates of each point are computed. Using the components in each direction, the processor 172 determines the steepest slope gradient 214 which, in the present example, is the smallest L/D ratio. A prescribed length L can be specified to improve the efficiency of the algorithm in locating the steepest slope gradient 214 and to limit the impact of scan noise for examples in which the prescribed length L is relatively small.

Figure 29:
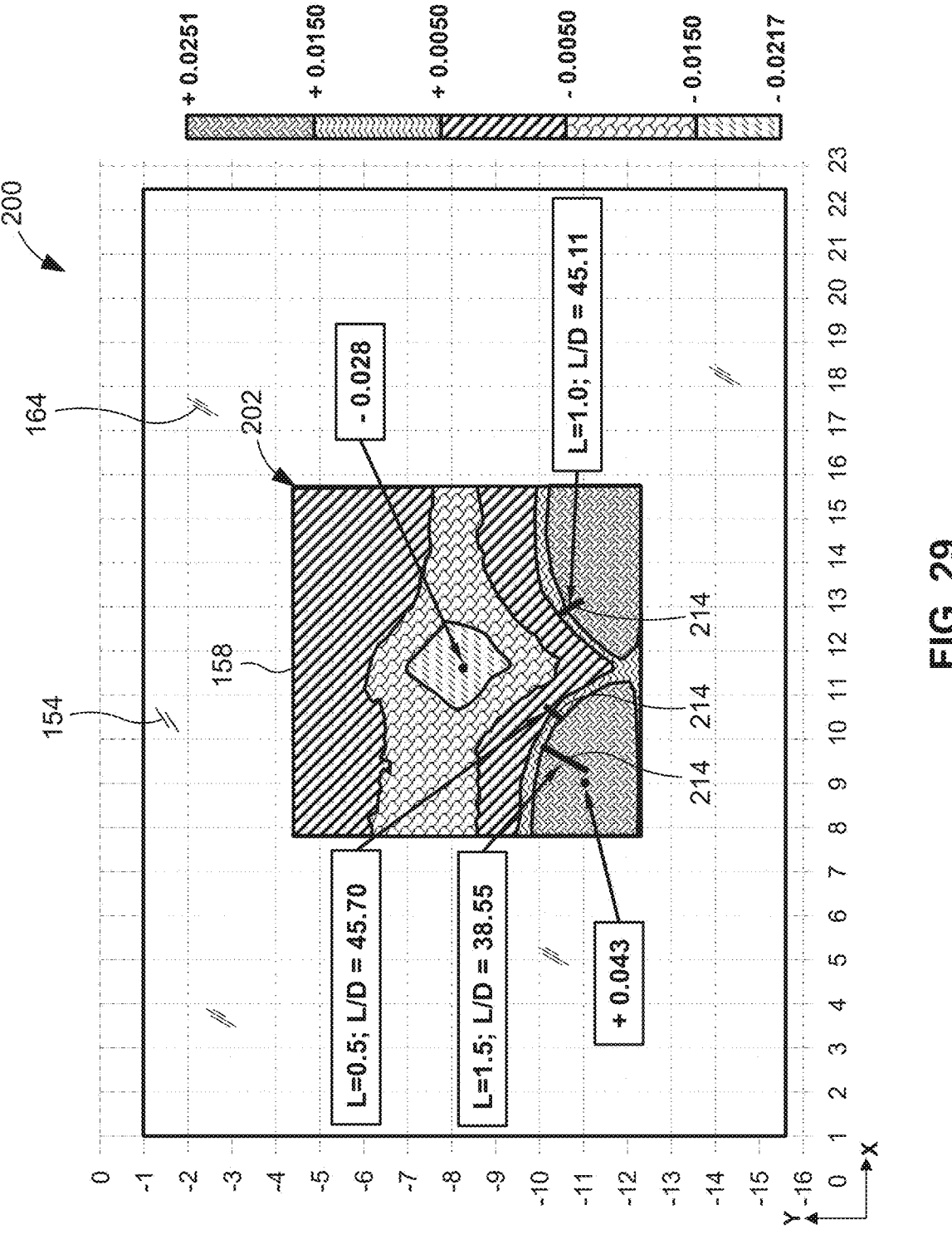
FIG. 29 shows an example of a heatmap of the suspect region showing the highest point, the lowest point, and the steepest slope gradients for three different lengths of the slope.

In the example of FIG. 27, the steepest slope gradient 214 has an L/D of 45.11 for a prescribed length L of 1.0 linear units. As may be appreciated, if a different value (e.g., L=0.5 linear units) is prescribed for the length L, the steepest slope gradient 214 will occur at a different point in the suspect region 158 and will have a different orientation and a different value for the ratio L/D. FIG. 29 shows the heatmap 202 similar to FIGS. 26-27, and also shows the location of the three steepest slope gradients 214 respectively for three different prescribed lengths L. More specifically, in addition to showing the above-mentioned steepest slope gradient 214 of L/D of 45.11 for length L of 1.0 linear units, FIG. 29 also shows the location and orientation of the steepest slope gradient 214 (i.e., L/D of 45.70) for a prescribed length L of 0.5 linear units, and the steepest slope gradient 214 (i.e., L/D of 38.55) for a prescribed length L of 1.5 linear units.

Figure 30:
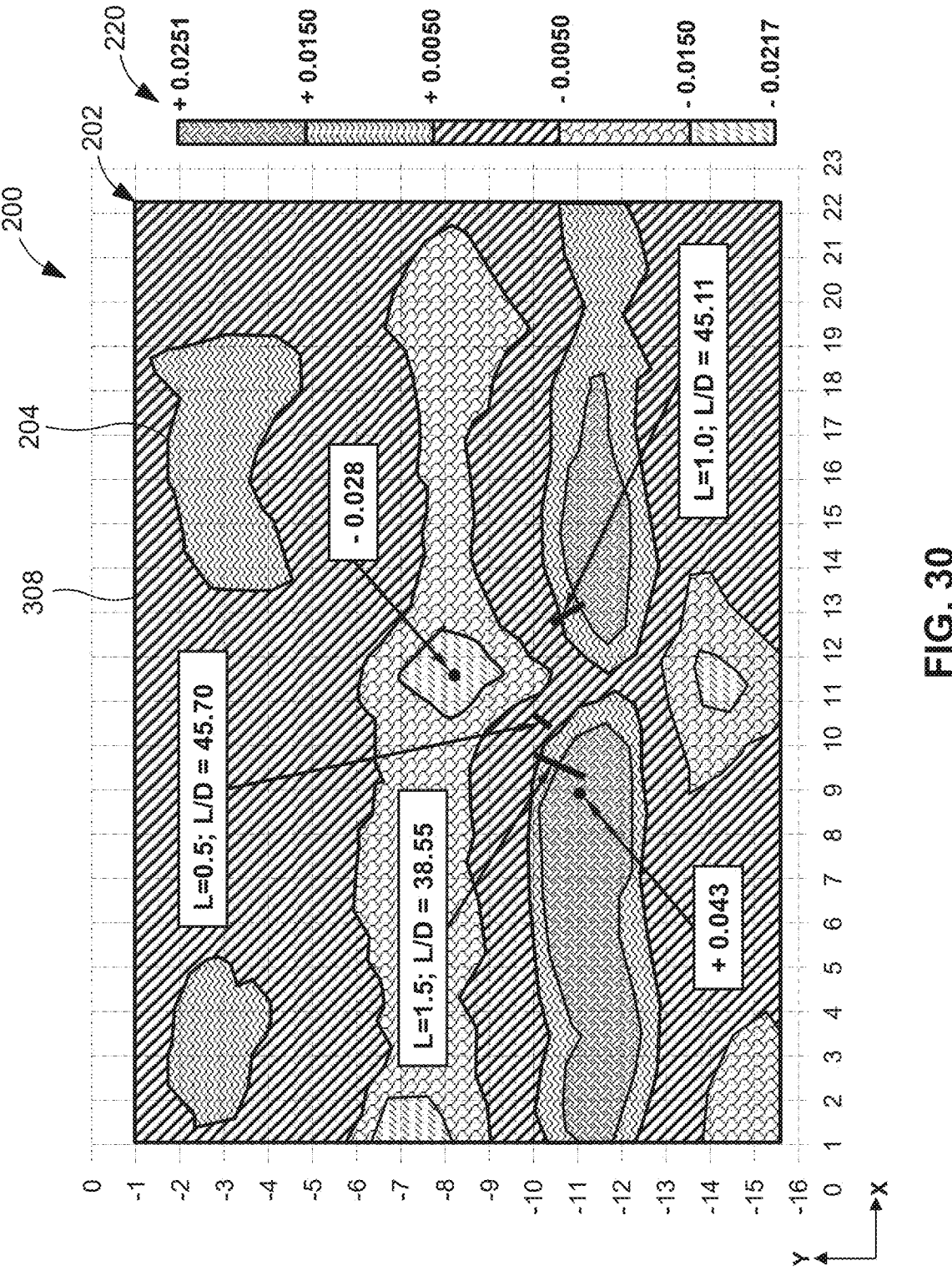
FIG. 30 shows an example of a heatmap graphically illustrating the surface contours of the entire localized portion including the suspect region and the non-defective region.

FIG. 30 shows an example of a heatmap 202 of the entire localized portion 308, which includes the suspect region 158 (FIG. 29) and the non-defective region 154 (FIG. 29). As mentioned above, the heatmap 202 is a difference map showing surface contours 204 that graphically illustrate deviations of the point cloud 150 (i.e., the raw scan data—FIG. 25) of the localized portion 308 relative to the reference surface 164 (FIG. 25) of the localized portion 308. The deviation legend 220 on the right hand side of FIG. 30 shows deviations values and crosshatching patterns corresponding to the crosshatching in the heatmap 202 of the localized portion 308. As described below, generating a heatmap 202 across the suspect region 158 and/or across the entire localized portion 308 is helpful in determining the root cause of surface characteristics (e.g., surface defects) of the inspection surface 306, and additionally provides a means for understanding the impact of surface characteristics on the structure 300, such as from a performance perspective (e.g., strength, aerodynamics, etc.) and/or from an aesthetic perspective (e.g., visual appeal).

Figure 31:
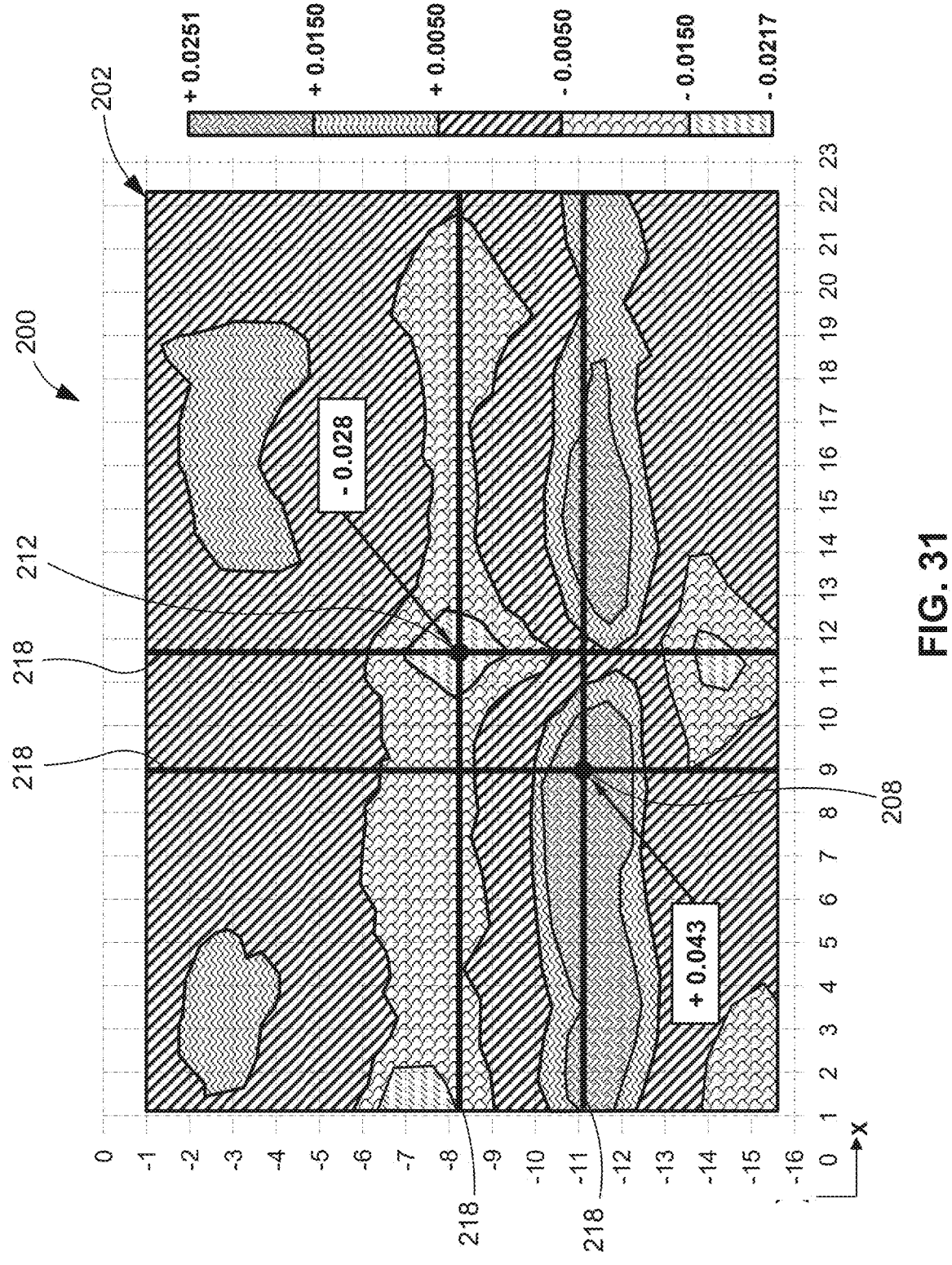
FIG. 31 shows the heatmap of FIG. 30 showing the location of cross-sectional profiles passing through the highest point and the lowest point and aligned with the longitudinal direction and circumferential direction of the fuselage.
Figures 32, 33:
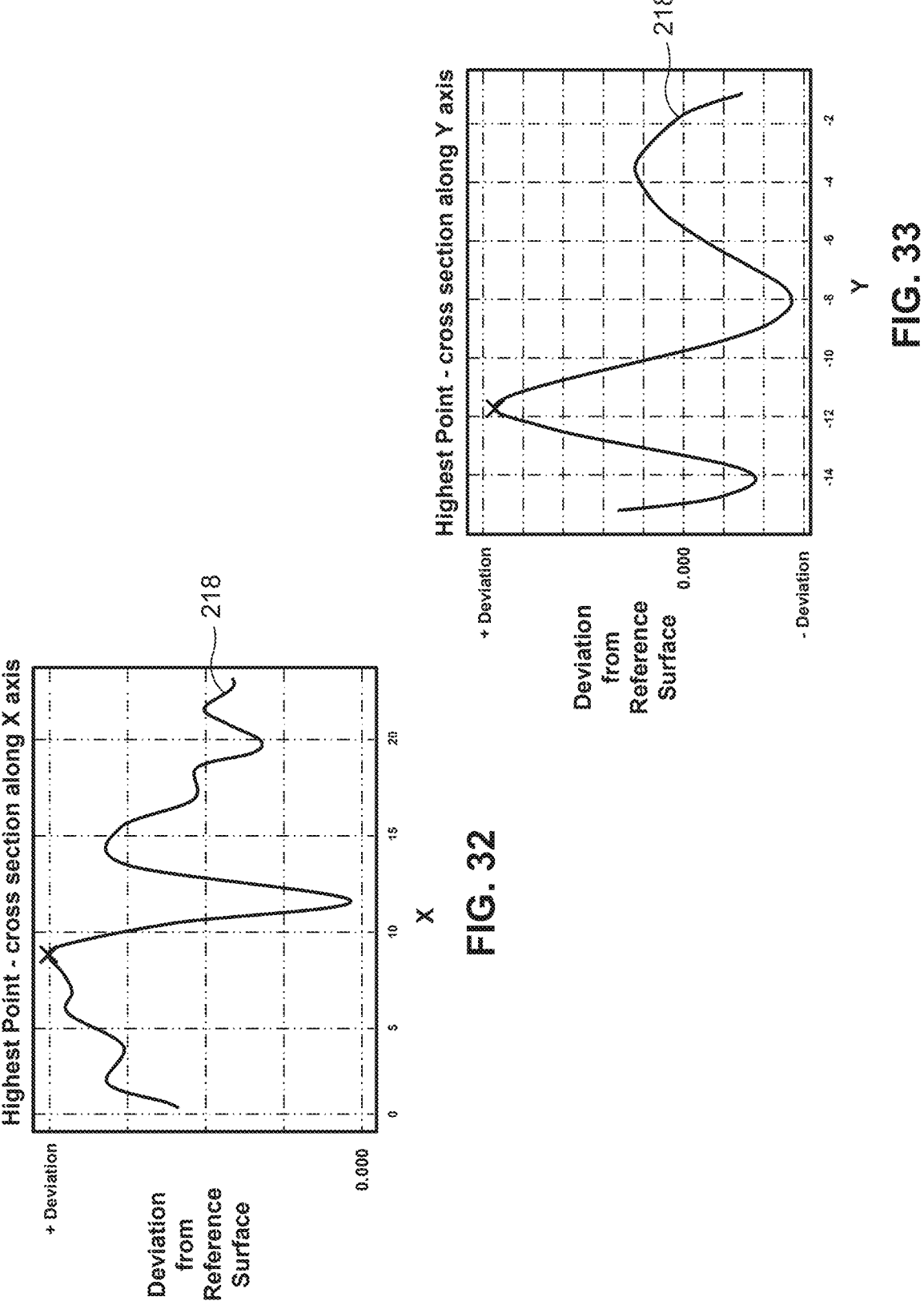
FIG. 32 is a plot of the cross-sectional profile of the suspect region passing through the highest point and aligned with the longitudinal direction (e.g., x-axis) of the fuselage.
FIG. 33 is a plot of the cross-sectional profile of the suspect region passing through the highest point and aligned with the circumferential direction (y-axis) of the fuselage.

In some examples of the surface inspection system 100, the processor 172 is configured to generate cross-sectional profiles 218 of the suspect region 158 and which are normalized to the reference surface 164. For example, FIG. 31 is the heatmap 202 of FIG. 30 further illustrating the location of cross-sectional profiles 218 passing through the highest point 208 and the lowest point 212 in the suspect region 158, and which are illustrated in FIGS. 32-35. FIG. 32 shows the plot of the cross-sectional profile 218 of the suspect region 158 passing through the highest point 208 and which is aligned with the longitudinal direction (i.e., parallel to x-axis) of the fuselage 402. FIG. 33 shows the cross-sectional profile 218 passing through the highest point 208 of the suspect region 158 and which is aligned with the circumferential direction (i.e., parallel to y-axis) of the fuselage 402. FIG. 34 is a plot of the cross-sectional profile 218 of the suspect region 158 passing through the lowest point 212 and which is aligned with the longitudinal direction of the fuselage 402. FIG. 35 shows a cross-sectional profile 218 passing through the lowest point 212 of the suspect region 158 and which is aligned with the circumferential direction of the fuselage 402.

As described above, the scan template 120 can include alignment features 144 such as a directional arrow 146 for aligning the scan template 120 with a principal direction 148 of the surface contour requirements specified for the inspection surface 306. In some examples, the processor 172 can determine the steepest slope gradient 214 in a cross-sectional profile 218 that is parallel to the principal direction 148 (FIG. 2), as is the case for the above-described cross-sectional profiles 218 shown in FIGS. 32 and 34 which pass respectively through the highest point 208 and lowest point 212 of the suspect region 158. The cross-sectional profiles 218 can facilitate a determination of the effects on the behavior of air flow over the inspection surface 306 or the effects on the strength characteristics of the structure 300. Cross-sectional profiles 218 can be generated at any location in the inspection surface 306, and are not limited to passing through the highest point 208 and lowest point 212 of the suspect region 158. In addition, cross-sectional profiles 218 can be oriented in any direction, and are not limited to being parallel to the principal direction 148 of surface contour requirements.

In some examples, cross-sectional profiles 218 can be generated based on the local z-direction differences between the point cloud 150 (i.e., the raw scan data) and the reference surface 164, which effectively normalizes the cross sectional data. In another method, cross-sectional profiles 218 can be normalized to account for out-of-plane curvature and/or out-of-plane tilting of the inspection surface 306 relative to the pointing direction of the 3D scanner 104 when generating the point cloud 150, in contrast to an inspection surface 306 that is planar and/or which is perpendicular (i.e. normal) to the pointing direction of the 3D scanner 104. For example, in the case of a fuselage 402 as shown in FIGS. 1-2, cross-sectional profiles 218 in the circumferential direction can be flattened to account for the ovalized-circular cross-sectional shape typical of the fuselage 402 of commercial aircraft 400. In tapered areas of the fuselage 402 such as at the forward end or aft end, cross-sectional profiles 218 in the longitudinal direction can be rotated to account for out-of-plane tilting of the inspection surface 306.

Figure 36:
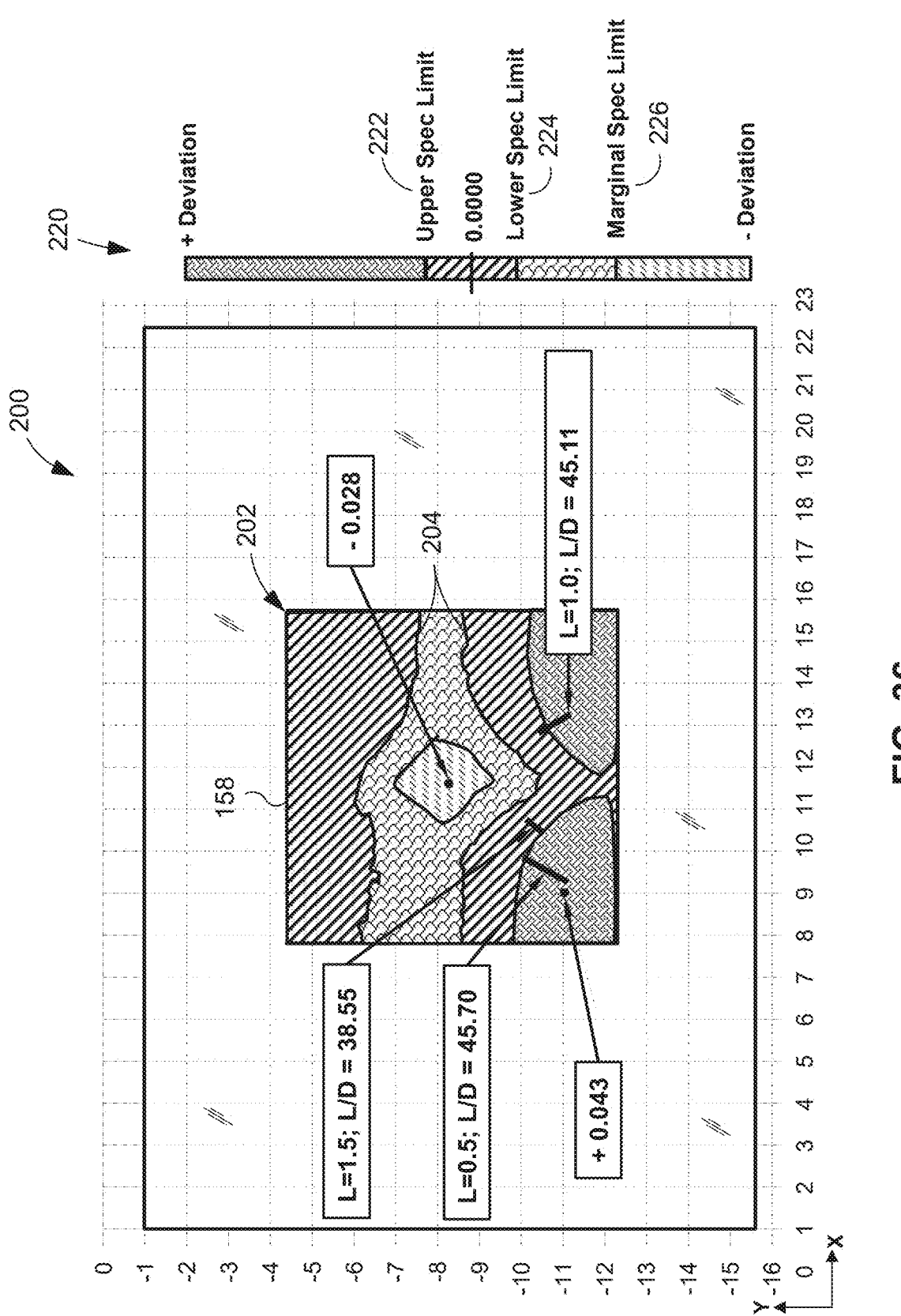
FIG. 36 shows a heatmap of surface contours of the suspect region, and further illustrating a deviation legend containing cross hatching and corresponding threshold values specified by from surface contour requirements of the inspection surface.

Referring to FIG. 36, shown is an example of a pass/fail heatmap 202 containing surface contours 204 of the suspect region 158 similar to the heatmap 202 example shown in FIG. 29. In FIG. 36, the deviation legend 220 lists the allowable threshold values or limits specified by the surface contour requirements of the inspection surface 306. In some examples of the surface inspection system 100, the processor 172 is configured to determine if one or more characteristics of the shape of the point cloud 150 violates one more limits specified by the surface contour requirements. For example, the processor 172 can determine if the height of the highest point 208 in the suspect region 158 exceeds an upper spec limit 222 specified by the surface contour requirements, which would be a failing condition. The processor 172 can also determine if the depth of the lowest point 212 in the suspect region 158 exceeds a lower spec limit 224 specified by the surface contour requirement, which would also be a failing condition.

In another example, if the depth of the lowest point 212 exceeds the lower spec limit 224 and the slope gradient L/D is above a specified value (e.g., the L/D is greater than 50), the processor 172 can determine if the depth exceeds a marginal spec limit 226, which would also be a marginal passing condition. In this case, a slope gradient L/D below the specified value (e.g., an L/D of less than 50) would be a failing condition. As may be appreciated, the surface contour requirements can include any one of a variety of different allowable conditions or limits for which the suspect region 158 can be analyzed to determine if the suspect region 158 is in conformance with the surface contour requirements. For example, the processor 172 can determine if the suspect region 158 contains a slope gradient that violates a slope gradient spec limit regardless of the height or depth along the slope gradient, and which may be useful information when performing a stress analysis on the structure 300.

The cross-hatching in the pass/fail heatmap 202 of FIG. 36 identifies which portions of the suspect region 158 that are in conformance with spec limits of the surface contour requirements (i.e., a passing condition), which portions are marginal (i.e., a marginal condition), and which portions are out-of-tolerance from the surface contour requirements (i.e., a failing condition). In situations where there is a failing condition in a suspect region 158, the processor 172 can notify the operator or inspector via a pop-up message (not shown) on a display screen 178 (FIG. 7) of a computing device 174 (FIG. 7), or via a text message, email, or any one of a variety of other means for signaling a failing condition and/or notifying the operator or inspector. Information regarding analysis of the suspect region 158 including heatmaps 202, cross-sectional profiles 218, and a listing of failing conditions can be recorded in the above-mentioned data library (not shown) for later reference.

As mentioned above, the processor 172 functions as the data reporting system of the surface inspection system 100, and autonomously generates reports including the generating heatmaps 202 and inspection results that the processor 172 stores in the data library. Additionally, the processor 172 can autonomously generate a report 200 (e.g., in PDF format) containing the heatmaps 202 (e.g., FIGS. 26, 27, 29, 31, and 36). The heatmap 202 can identify various surface characteristics of the suspect region 158 and/or non-defective region 154, such as identifying the highest point 208, the lowest point 212, and/or the slope gradients (e.g., steepest slope gradients 214) within the suspect region 158 (e.g., FIGS. 26, 27, 29, and 36) and/or within the entire localized portion 308 (e.g., FIG. 30) of the inspection surface 306. Although the presently disclosed heatmaps 202 use cross-hatching to designate the amounts by which the suspect region 158 (or non-defective region 154) deviates from the reference surface 164, any one of a variety of other types of indicia such as color coding can be used in the heatmap 202. Cross-sectional profiles 218 (e.g., FIGS. 32-35) can be included in the report 200 along with the heatmaps 202. As mentioned above, cross-sectional profiles 218 can be taken at any point in a localized area of an inspection surface 306 and can be oriented in any direction, and are not limited to passing through the highest point 208 and lowest point 212 of the suspect region 158 and are not limited to being oriented parallel to a principal direction 148 of the surface contour requirements.

The processor 172 is configured to save all data generated by the surface inspection system 100 in a time-stamped folder (not shown) of the data library (not shown). The saved data includes the raw point cloud 150, the baseline surface, the well-ordered grid 162, the reference surface 164, the cross-section data, and other data. In addition to saving the raw data, the inspection results can include pass/fail data indicating the magnitude and location of surface defects (e.g., depressions 210, bulges 206), and root cause analysis and disposition or repair actions of the surface defects. The raw data and inspection results are saved along with the template location data 138 (FIG. 12), which is defined relative to the structure 300 to enable traceability and to establish the digital thread (e.g., an as-built CAD model of the structure-not shown). The digital thread enables surface defects (e.g., depressions 210, bulges 206) identified by the surface inspection system 100 to be monitored, reviewed, and addressed at any point throughout the lifecycle of the structure 300. In the context of aircraft maintenance, the information saved in the digital thread ensures that the aircraft remains safe and operational throughout its operational life.

The surface inspection system 100 can also be configured to optimize any one or more of its operating parameters. Because the data acquisition system 102, data analysis system 170, and data reporting system are integrated, any one or more operating parameters can be adapted and optimized to ensure that the surface inspection system 100 performs as desired for any given structure 300. For example, operating parameters of the 3D scanner 104 and/or the scan template 120 of the data acquisition system 102 can be optimized for a given size, shape, configuration, and environment of the structure 300 to be inspected. Additionally, the operating parameters of the processor 172 with regard to data analysis can be optimized, including optimizing techniques for detection of surface discontinuities 310, performing root cause analysis, and identifying defect trends. Operating parameters of the processor 172 with regard to data reporting can also be optimized with regard the template location data 138 and the types of metrics included in the inspection results.

Referring to FIG. 37, shown is a flow chart of a method 500 of inspecting an inspection surface 306 of a structure 300. Any one or more of the above-described functionalities and capabilities of the surface inspection system 100 can be performed in any one or more of the below-described steps or operations of the method 500.

Step 502 of the method 500 includes scanning, using a three-dimensional (3D) scanner, the inspection surface 306 and acquiring a point cloud 150 of points 152 representing at least a localized portion 308 of the inspection surface 306 as shown in FIG. 10. As described above and shown in FIG. 15, the localized portion 308 includes the non-defective region 154 and the suspect region 158. The suspect region 158 is at least partially surrounded by the non-defective region 154 and potentially contains one or more defects. In the example of FIG. 16, the suspect region 158 is entirely surrounded by the non-defective region 154 to provide context for measuring surface characteristics and allow proper interpretation of the inspection to justify inspection buy-off.

As described above, the process of inspecting the inspection surface 306 can be initiated by an operator or an inspector identifying a suspect region 158 of an inspection surface 306 by visually observing potential defects (e.g., depressions 210, bulges 206, etc.). Alternatively or additionally, the location of the suspect region 158 of an inspection surface 306 can be based on historical data identifying certain areas of an inspection surface 306 in which defects have been detected. Historical data may be derived from personal knowledge of an inspector and/or from inspection reports of previously manufactured versions of the same type of structure 300.

Alternatively, the suspect region 158 can be identified by analyzing the point cloud 150 generated during the scanning of the inspection surface 306. In this regard, the processor 172 can analyze the point cloud 150 and designate as the suspect region 158 the points 152 that, based on computations by the processor 172, exceed a stochastic threshold or a surface-rate-of-change threshold, as described above. In still other examples, the method can include designating a center portion 156 of the point cloud 150 as the suspect region 158 based on an assumption that the center portion 156 contains points 152 that represent potential defects in the inspection surface 306.

In some examples, the method 500 includes positioning a scan template 120 in relation to the inspection surface 306 to define the size and shape of the localized portion 308. For example, as described above, the method can include mounting a physical template 122 on the inspection surface 306 prior to scanning via the 3D scanner 104. The physical template 122 has a template opening 130 of predetermined size and shape. The physical template 122 can be located on the inspection surface 306 with the assistance of a template positioning aide 132 as described above and shown in FIGS. 3-4. Alternatively, positioning the scan template 120 in relation to the inspection surface 306 can comprise projecting, using a light projector, a projected template 124 onto the inspection surface 306 at least during scanning via the 3D scanner 104, as described above. In still other examples, the process of positioning the scan template 120 in relation to the inspection surface 306 can include cropping, via software (i.e., a virtual template), areas of the point cloud 150 located outside of the localized portion 308 after scanning the inspection surface 306.

In any one of the above-described examples, the size and shape of the localized portion 308 can be determined by visual observation of the size and shape of the portion of the inspection surface 306 encompassing potential defects. To provide proper context for the inspection process, the area of the non-defective region 154 is preferably 1.5 to 20 times larger than the area of the suspect region 158. Alternatively or additionally, the non-defective region 154 can be sized and shaped to encompasses an area of the structure 300 containing at least one underlying structural member 304 such as internal frames (e.g., longerons 408, circumferential frames 410) supporting an exterior skin 302, as underlying structural members 304 can contribute to the existence of surface defects potentially contained in the suspect region 158.

The method 500 includes capturing, using a template locating system, the location of the scan template 120 relative to the structure 300. In some examples, the template locating system can comprise manual entry of the template location data 138 as shown in 11-12. As mentioned above, the template location data 138 defines the location of the scan template 120 relative to the structure 300. As an alternative to or in addition to manual entry of the template location data 138, the template locating system can include an indoor tracking system (not shown) capable of tracking the location of the scan template 120 relative the structure 300, and automatically recording the template location data 138 when a scan is initiated. As described above, the scanning system can comprise any one of a variety of arrangements including, but not limited to, a local positioning system (e.g., a GPS-like system) comprising small transceivers mounted on the scan template 120 and which communicate with a plurality of transmitters installed at fixed locations in the environment of the structure 300. In another example, the tracking system can include a network of infrared cameras and/or ultrasonic beacons for tracking the location of the scan template 120 on the structure 300. In still another example, the tracking system can include laser trackers emitting lasers that reflect off of small spherical reflectors mounted on scan template 120 for triangulating its location on the structure 300.

The process of generating the point cloud 150 (FIG. 10) results in a polygonized mesh 166 as shown in FIGS. 11-12 and described above. The polygonized mesh 166 is cropped to remove the localized portion 308 of the inspection surface 306 from the remainder of the polygonized mesh 166 as shown in FIG. 13. As described above, the localized portion 308 is defined by the template opening 130, and is separable into two regions, including the suspect region 158 and the non-defective region 154, which surrounds the suspect region 158.

Step 504 of the method 500 includes establishing, using a processor 172, a reference surface 164 based on the points 152 in the non-defective region 154 and exclusive of the points 152 in the suspect region 158. Although the points 152 in the suspect region 158 are excluded when establishing the reference surface 164 as shown in FIG. 21, the reference surface 164 extends across the suspect region 158 as shown in FIG. 22. Step 504 of establishing the reference surface 164 can be performed using any one of a variety of surface fitting techniques including, but not limited to, polynomial surface fitting (e.g., third order polynomial surface fitting) or surface filtering.

In some examples, the method 500 includes identifying and excluding surface discontinuities 310 when establishing the reference surface 164. The process of identifying surface discontinuities 310 includes generating a well-ordered grid 162 of uniformly-spaced points 152 via interpolation of the loose or unstructured arrangement of points 152 in the point cloud 150 of the localized portion 308, as described above. In addition to generating the well-ordered grid 162, the processor 172 also generates a baseline surface (i.e., an initial reference surface-not shown) which is a polynomial surface fit of all the points 152 in the raw point cloud 150 data of the localized portion 308. Each point in the well-ordered grid 162 is compared to the baseline surface to establish a height value (i.e., in the local z direction) for each point in the well-ordered grid 162, which is then converted to a grayscale pixel intensity value of from 0 to 255, resulting in the formation of an image of the localized portion 308.

Once formed, the image is subjected to image processing techniques such as edge detection and contour mapping to identify the points 152 in the well-ordered grid 162 that have the most abrupt changes in pixel intensity, and which represent the locations of surface discontinuities 310 in the inspection surface 306. The points 152 in the well-ordered grid 162 that represent surface discontinuities 310 are traced back to the corresponding points 152 in the point cloud 150, and which are disregarded when establishing the reference surface 164 based on the point cloud 150 as described above.

In some examples, the method 500 comprises disregarding from the point cloud 150 the points 152 that represent scan noise. As described above, scan noise includes random deviations in the height of some of the points 152 in the point cloud 150 as a result of factors such as vibration of the 3D scanner 104 and/or surface reflectivity of the inspection surface 306 during the scanning process. In the above described process of identifying surface discontinuities 310 via the well-ordered grid 162, scan noise is inherently identified and is disregarded when establishing the reference noise Step 506 of the method 500 includes determining, using the processor 172, one or more characteristics associated with a shape of the point cloud 150 relative to the reference surface 164 within the suspect region 158. As shown in FIGS. 24-25 and described above, the point cloud 150 of the suspect region 158 is compared to the reference surface 164 and the suspect region 158. The comparison can be performed via the processor 172 in a manner similar to the above-described process of comparing the points 152 of the well-ordered grid 162 of the localized portion 308 to the baseline surface of the localized portion 308. In this regard, step 506 comprises determining the deviation in the local z direction of each point in the point cloud 150 of the suspect region 158 to the reference surface 164 in the suspect region 158. Such comparison results in a difference map or heatmap 202 illustrating areas of the suspect region 158 relative that differ in height or depth from the reference surface 164, as shown in FIG. 26.

In some examples, step 506 of determining surface characteristics of the suspect region 158 relative to the reference surface 164 can include determining the location and height of the highest point 208 and lowest point 212 in the suspect region 158 as shown in FIGS. 26 and 29 and described above. Alternatively or additionally, step 506 of determining surface characteristics of the suspect region 158 can include determining the location and orientation of the steepest slope gradient 214 in the suspect region 158 as shown in FIGS. 27 and 29. In the example shown, the steepest slope gradient 214 is expressed as the ratio of length L to depth D. To reduce computational time, any one of a variety of different values can be prescribed for the length L. As an alternative to L/D, the steepest slope gradient 214 can be calculated as the ratio of depth D to length L (i.e., D/L).

The method 500 can optionally include generating cross-sectional profiles 218 of the suspect region 158 as shown in FIGS. 31-35. In some examples, the cross-sectional profiles 218 are generated based on local z-direction differences between the point cloud 150 and the reference surface 164. In other examples, the cross-sectional profiles 218 are normalized to account for out-of-plane curvature and/or out-of-plane tilting of the inspection surface 306.

In some examples, the method 500 includes aligning the scan template 120 with a principal direction 148 of the surface contour requirements of the inspection surface 306, such as by using one or more alignment features 144 (e.g., a directional arrow 146) on the scan template 120. With the scan template 120 aligned with the principal direction 148, the method 500 includes determining the steepest slope gradient 214 in a cross-sectional profile 218 of the suspect region 158 which is parallel to the principal direction 148. In the example shown, the cross-sectional profiles 218 of FIG. 32-35 pass through the highest point 208 (FIGS. 32-33) and the lowest point 212 (FIGS. 34-35) of the suspect region 158 relative to the reference surface 164. However, the method can include generating cross-sectional profiles 218 that are oriented in any one of a variety of different directions, and which pass through any one of a variety different locations in the suspect region 158.

In some examples, the method 500 can include determining, using the processor 172, if one or more characteristics of the shape of the point cloud 150 in the suspect region 158 violate one more limits specified by surface contour requirements of the inspection surface 306. For example, as shown in FIG. 36, the pass/fail heatmap 202 includes cross hatching that identifies which portions of the suspect region 158 violate the spec limits (i.e., a failing condition) of the surface contour requirements as shown in the deviation legend 220, and which portions of the suspect region 158 are in conformance with the spec limits (i.e., a passing condition). As mentioned above, the method 500 can include providing an indication when there is a failing condition in the suspect region 158 under inspection. For example, the processor 172 can display a pop-up message on a display screen 178 of a computing device 174, or transmit a text message or email to notify an operator of the failing condition.

The method 500 can further include generating, using the processor 172, a report 200 containing the above-described heatmaps 202 and/or cross-sectional profiles 218 within the suspect region 158 and/or within the localized portion 308 which encompasses both the suspect region 158 and the non-defective region 154. As described above, the heatmaps 202 graphically illustrate the shape of the point cloud 150 within the suspect region 158 and can optionally identify the highest point 208, the lowest point 212, and/or the steepest slope gradient 214. The report 200 can also contain any cross-sectional profiles 218 of the shape of the point cloud 150 passing through any location of the suspect region 158, such as the highest point 208 and/or the lowest point 212. As mentioned above, the cross-sectional profiles 218 can be aligned with one or more principal directions 148 of the surface contour requirements of the localized portion 308. The report 200 can indicate whether the highest point 208, the lowest point 212, and/or a slope gradient of the suspect region 158 violates a limit specified by the surface contour requirements.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A surface inspection system for inspecting a localized portion of an inspection surface of a structure, comprising:
   a three-dimensional (3D) scanner configured to scan the inspection surface and acquire a point cloud of points representing at least the localized portion, and the localized portion includes a non-defective region and a suspect region at least partially surrounded by the non-defective region and potentially containing one or more defects;
   a processor configured to perform the following:
      establish a reference surface based on the points in the non-defective region and exclusive of the points in the suspect region, and the reference surface extends across the suspect region; and
      determine one or more characteristics of a shape of the point cloud relative to the reference surface within the suspect region.

2. The surface inspection system of claim 1, wherein the processor is configured to determine the one or more characteristics of the shape of the point cloud, by determining at least one of the following relative to the reference surface:
   a location and a height of a highest point;
   a location and a depth of a lowest point; and
   a location and an orientation of a steepest slope gradient.

3. The surface inspection system of claim 1, wherein the processor is configured to determine if one or more characteristics of the shape of the point cloud violates one more limits specified by surface contour requirements of the inspection surface.

4. The surface inspection system of claim 1, further comprising:
   a scan template positionable in relation to the inspection surface and defining a size and a shape of the localized portion, and configured as one of the following:
      a physical template configured to be mounted on the inspection surface prior to scanning via the 3D scanner;
      a projected template projected onto the inspection surface during scanning via the 3D scanner;
      a virtual template in which the processor is configured to crop areas of the point cloud located outside of the localized portion after scanning via the 3D scanner.

5. The surface inspection system of claim 4, wherein:
   the scan template includes one or more alignment features configured to facilitate alignment of the scan template with a principal direction of surface contour requirements of the localized portion; and
   the processor is configured to determine a slope gradient of a contour cross section that is parallel to the principal direction and which passes through one of a highest point and a lowest point in the point cloud relative to the reference surface.

6. The surface inspection system of claim 1, wherein the non-defective region is sized according to at least one of the following:

the non-defective region encompasses an area of the inspection surface containing at least one underlying structural member; and the area of the non-defective region is 1.5 to 20 times larger than the area of the suspect region.

7. The surface inspection system of claim 1, wherein the processor is configured to exclude from the point cloud the points representing surface discontinuities in the inspection surface.

8. The surface inspection system of claim 1, wherein the processor is configured to exclude from the point cloud the points representing scan noise.

9. The surface inspection system of claim 1, wherein the processor is configured to establish the reference surface using one of polynomial surface fitting or surface filtering.

10. The surface inspection system of claim 1, wherein the processor is configured to generate a report containing at least one of the following:

a heatmap graphically illustrating surface contours of the point cloud within the suspect region and indicating at least one of a highest point, a lowest point, and a steepest slope gradient;

cross-sectional profiles of the shape of the point cloud within the suspect region and passing through the highest point and the lowest point and aligned with one or more principal directions of surface contour requirements of the localized portion; and an indication of whether at least one of the highest point, the lowest point, and one or more slope gradients of the suspect region violates one or more limits specified by the surface contour requirements.

11. A system for inspecting a localized portion of an inspection surface of a structure, comprising:

a scan template positionable in relation to the inspection surface and defining a size and a shape of the localized portion of the inspection surface, and the localized portion contains a non-defective region and a suspect region at least partially surrounded by the non-defective region and potentially having one or more defects;

a three-dimensional (3D) scanner configured to scan the localized portion and acquire a point cloud of points;

a processor configured to perform the following:

establish a reference surface based on the points in the non-defective region and exclusive of the points in the suspect region, and the reference surface extends across the suspect region;

determine one or more characteristics associated with a shape of the point cloud relative to the reference surface within the suspect region, the characteristics comprising:

a location and a height of a highest point;

a location and a depth of a lowest point; and a location and an orientation of a slope gradient of a contour cross section passing through at least one of the highest point and the lowest point, and oriented parallel to a principal direction of surface contour requirements of the localized portion.

12. A method of inspecting an inspection surface of a structure, comprising:

scanning, using a three-dimensional (3D) scanner, the inspection surface and acquiring a point cloud of points representing at least a localized portion of the inspection surface, and the localized portion includes a non-defective region and a suspect region at least partially surrounded by the non-defective region and potentially containing one or more defects;

establishing, using a processor, a reference surface based on the points in the non-defective region and exclusive of the points in the suspect region, and the reference surface extends across the suspect region; and determining, using the processor, one or more characteristics associated with a shape of the point cloud relative to the reference surface within the suspect region.

13. The method of claim 12, wherein determining the one or more characteristics associated with the shape of the point cloud comprises determining at least one of the following relative to the reference surface:

determining a location and a height of a highest point;

determining a location and a depth of a lowest point; and determining a location and an orientation of a steepest slope gradient.

14. The method of claim 12, further comprising:

determining, using the processor, if the one or more characteristics of the shape violates one more limits specified by surface contour requirements of the inspection surface.

15. The method of claim 12, further comprising positioning a scan template in relation to the inspection surface to define a size and a shape of the localized portion, by performing one of the following:

mounting a physical template on the inspection surface prior to scanning via the 3D scanner;

projecting, using a light projector, a projected template onto the inspection surface during scanning via the 3D scanner;

cropping, using a virtual template, areas of the point cloud located outside of the localized portion after scanning via the 3D scanner.

16. The method of claim 15, further comprising:

aligning the scan template with a principal direction of surface contour requirements of the localized portion using one or more alignment features of the scan template; and determining a steepest slope gradient in a cross-sectional profile of the point cloud within the suspect region and which is parallel to the principal direction and passing through one of a highest point and a lowest point of the suspect region relative to the reference surface.

17. The method of claim 12, further comprising:

excluding from the point cloud the points representing surface discontinuities in the inspection surface.

18. The method of claim 12, further comprising:

excluding from the point cloud the points representing scan noise.

19. The method of claim 12, wherein establishing the reference surface comprises:

establishing the reference surface using one of polynomial surface fitting or surface filtering.

20. The method of claim 12, further comprising:

generating, using the processor, a report containing at least one of the following:

a heatmap graphically illustrating the shape of the point cloud within the suspect region and indicating at least one of a highest point, a lowest point, and a steepest slope gradient;

cross-sectional profiles of the shape passing through the highest point and the lowest point and aligned with one or more principal directions of surface contour requirements of the localized portion; and an indication of whether at least one of the highest point, the lowest point, and one or more slope gradients in the suspect region violates a limit specified by the surface contour requirements.

\* \* \* \* \*